(12) United States Patent
Torng

(10) Patent No.: US 7,840,376 B2
(45) Date of Patent: Nov. 23, 2010

(54) RISK-BASED DESIGN AND MAINTENANCE SYSTEMS AND METHODS

(75) Inventor: Yi Tony Torng, Diamond Bar, CA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 12/052,256

(22) Filed: Mar. 20, 2008

(65) Prior Publication Data

US 2009/0240468 A1  Sep. 24, 2009

(51) Int. Cl.
*G04G 15/00* (2006.01)
(52) U.S. Cl. .................................... 702/177
(58) Field of Classification Search ............. 702/35, 702/59, 98, 99, 138, 176–185, 193; 244/100 R; 703/2
See application file for complete search history.

(56) References Cited

U.S. PATENT DOCUMENTS

| | | | |
|---|---|---|---|
| 6,098,022 A * | 8/2000 | Sonnichsen et al. ......... 702/35 |
| 6,122,575 A | 9/2000 | Schmidt et al. |
| 6,460,012 B1 * | 10/2002 | Welch et al. ............... 702/182 |
| 6,574,537 B2 | 6/2003 | Kipersztok et al. |
| 6,725,137 B2 | 4/2004 | Eagleton et al. |
| 6,799,154 B1 | 9/2004 | Aragones et al. |
| 6,868,319 B2 | 3/2005 | Kipersztok et al. |
| 7,209,814 B2 | 4/2007 | Kipersztok et al. |
| 7,222,048 B2 | 5/2007 | Petchenev et al. |
| 7,230,527 B2 | 6/2007 | Basu et al. |

* cited by examiner

*Primary Examiner*—Mohamed Charioui
(74) *Attorney, Agent, or Firm*—Armstrong Teasdale LLP

(57) ABSTRACT

A method for determining an optimal inspection schedule for a structure is described. The method includes determining a crack size distribution table for the structure, determining a plurality of risk values, each risk value for a different estimated usage hours of the structure and based on said crack size distribution table, estimating a first inspection interval based on a predetermined risk value threshold, and determining a second inspection interval based on analyzing the rate of increase of risk value and probability of detection of a crack in said first inspection interval.

20 Claims, 21 Drawing Sheets

RISK-BASED DESIGN AND MAINTENANCE SYSTEMS AND METHODS

STATEMENT REGARDING FEDERALLY SPONSORED RESEARCH & DEVELOPMENT

This invention was made with Government support under F33657-01-D2050 SD13, awarded by the Air Force. The government has certain rights in this invention.

BACKGROUND OF THE INVENTION

The field of the invention relates generally to quantitative or probabilistic risk assessment, and more specifically, to systems and methods for quantitative or probabilistic risk-based design and maintenance. For abbreviation, in the following paragraphs, risk assessment will be used to represent quantitative or probabilistic risk assessment.

Development of advanced risk assessment methodologies has been ongoing for some time. The following example relates to one application where a risk assessment may provide an alternative to physical inspections.

In this particular example, results from a deterministic crack growth analyses of the wing carry through lower cover attachments for a particular aircraft, indicated an immediate inspection was needed. However, there are no credible non-destructive inspection techniques available for inspecting the lower cover attachments as these covers are attached using fasteners. In other words, the attachment area of the cover cannot be inspected without removal of the fasteners. Removal of the fasteners is costly and there is a risk that the holes in the lower cover attachments could be compromised. The structure that underlies the lower cover could also be damaged when the fasteners are being removed. Therefore, for this particular "real world" example, a decision was made to delay the costly and potentially damaging inspections until a credible non-destructive inspection was developed. This decision was based on results of hole testing showed damage tolerance life improvements for this TaperLok hole was on the order of 9 to 10 times that of other hole types.

Unfortunately, no credible crack growth curve had been developed for the TaperLok hole to help extend its life. A set of standards has been established that defines the inspection and repair schedule based on deterministic analyses. However, there is no information regarding the risk of such decisions and there is no sensitivity information available to inform users of the most dominate life influencing factors, such as, fracture toughness, loads, or initial crack size. Due to large uncertainties involved in these key factors, a large safety factor has been selected to determine inspection intervals regardless of the results of the deterministic analyses. This large safety factor has in turn lead to smaller inspection intervals that consequently result in increased cost of operation.

Summarizing, the traditional deterministic analyses that have been used have resulted in inspection requirements that may be too conservative. A probabilistic risk assessment approach has been recommended as one way to overly conservative inspection requirements while still maintaining flight safety. In the wing carry through example, it was hoped that a probabilistic risk assessment would illustrate that there is a calculated low risk of crack growth could be used to demonstrate that grounding aircraft as they arrived at an inspection date can be safely avoided.

Mil-Std-1530C has been recently revised to include risk assessment requirements. The goals for the proposed comprehensive risk assessment process are twofold: to help determine changes to inspection and maintenance practices, and assess fleet impact for cracking found through aircraft conditional inspection (ACI), depot, or routine maintenance action. The changes to inspection and maintenances practices should result in increased inspection intervals for areas that have demonstrated minimal cracking, and a decrease in certain inspection intervals. Fleet impact assessment includes how much of the fleet may be impacted, is grounding necessary, and if the impact is fleet wide or limited. Finally, development of a guidance for Time Compliance Technical Order (TCTO) is anticipated

BRIEF DESCRIPTION OF THE INVENTION

In one aspect, a method for determining an optimal inspection schedule for a structure is provided. The method includes determining a crack size distribution table for the structure, determining a plurality of risk values, each risk value for a different estimated usage hours of the structure and based on said crack size distribution table, estimating a first inspection interval based on a predetermined risk value threshold, and determining a second inspection interval based on analyzing the rate of increase of risk value and probability of detection of a crack in said first inspection interval.

In another aspect, a computer programmed to assess risk associated with a structural inspection schedule for a flight platform is provided. The computer is programmed to utilize input data to evaluate a probability of fracture risk at the current accumulated hours of usage, and the probability of fracture risks for the current accumulated hours of usage plus or minus a range of usages, verify, over the usage range, that the probability of fracture risks increases monotonically, determine a risk associated with postponing, for a period of time, the inspection described by a structural maintenance plan, the determined risk based on a period of postponement that corresponds with the probability of fracture risk for a specific level of usage, evaluating if the determined risk is less than a risk requirement defined in the structural maintenance plan, and estimate the hours of usage for the flight platform until the first inspection, which is when the risk is substantially close to the risk requirement.

In still another aspect, a method for assessing a risk associated with a structural inspection schedule for a flight platform is provided. This method includes evaluating, based on input data, a probability of fracture risk at the current accumulated hours of usage, and the probability of fracture risks for the current accumulated hours plus or minus a range of usage hours. The method further includes verifying, over the range of usage hours, that the probability of fracture risks increases monotonically, determining a risk associated with postponing, for a period of time, the inspection described by a structural maintenance plan, the determined risk based on a period of postponement that corresponds with the probability of fracture risk for a specific usage hour, evaluating if the determined risk is less than a risk requirement defined in the structural maintenance plan, and estimating the hours of usage for the flight platform until the first inspection is needed, which is when the risk is substantially close to the risk requirement.

DETAILED DESCRIPTION OF THE INVENTION

Aircraft structural integrity programs (ASIPs) provide the basic requirements information to perform an effective risk assessment except a generic probabilistic analysis strategy. Basic requirements for an effective risk assessment include: aircraft usage characterization, crack growth and residual strength, and inspection data. Aircraft usage characterization includes a Loads and Environmental Spectra Survey (L/ESS) or Individual Aircraft Tracking (IAT) data. Crack growth and residual strength is based on demonstrated usage and location of interest, material parameters, and stress intensity solution ($\alpha = K/\sigma$). Inspection data includes crack size and usage hours at detection.

With this data, a probabilistic risk assessment can be used to compute the risk which can be compared with the single flight probability of failure requirement stated in Mil-Std-1530C. With the proposed probabilistic risk assessment strategy described herein, a deterministic safety factor approach can be converted into the risk and thus can be calibrated accordingly.

With a risk requirement of 1.0E-7 having been defined within Mil-Std-1530C, a comprehensive risk assessment process considers both existing probability of fracture (PROF) code and the herein described embodiments. For purposes of understanding, these embodiments are referred to as a Risk-Based Design and Maintenance System (RBDMS) and are utilized for evaluation of future inspection schedule. The rationales for selecting the proposed comprehensive risk assessment process are discussed herein as is its utilization as part of a Force Structural Maintenance Plan (FSMP).

One goal of the described comprehensive RBDMS and PROF processes described herein is the production of a single flight probability of failure (SFPOF) or risk result for each near term inspection that is identified in a FSMP. Then, based on these risk results, the risk associated with postponing the inspection for a period of time (such as one to five years) can be calculated. This calculation aids in the aligning of inspections to Programmed Depot Maintenance (PDM) schedules. This FSMP format will then include the calculated risk.

Figure 1:
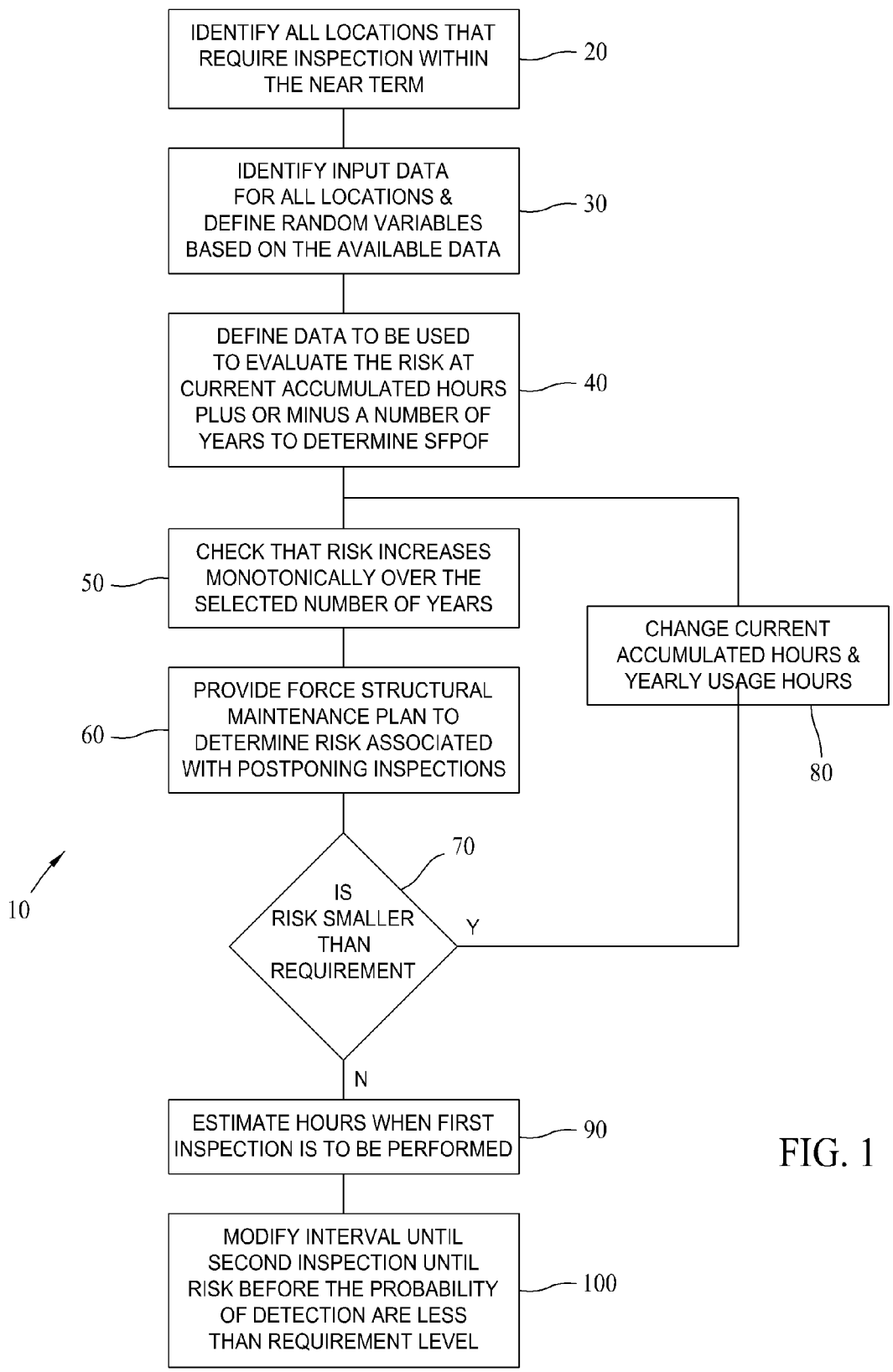
FIG. 1 is a flowchart that illustrates a comprehensive risk assessment process.

FIG. 1 is a flowchart 10 that illustrates the comprehensive risk assessment process. Specifically, all critical locations, for example on an airframe, that require inspection are identified 20. More specifically those areas that require inspection within the near term based on the current FSMP plan. Input data for all inspection locations are identified 30 and random variables are defined based on available data.

With the data and variables available, a user runs the RBDMS, for example, from a graphical user interface, to define 40 the input data for a first analysis to evaluate the risk at the current accumulated hours of usage and the risks for the current accumulated hours plus or minus one to ten years of usage hours, in one embodiment. In other words, a total of 21 years of single flight probability of failure or risk data will be calculated. From the 21 years of risk data, users perform a simple check 50 to make sure that the risk increases monotonically. Referring to the airframe example, without the invasiveness of inspections a crack should increase monotonically.

Force structural maintenance plan (FSMP) data is provided 60 to determine the risk associated with postponing the inspection for a period of time, for example, one to five years. This postponement, as described above, aids in aligning inspection schedules to programmed depot maintenance (PDM) schedules. It is then determined 70 if the risk is much smaller than a requirement, for example, the requirement of 1.0E-7 specified by Mil-Std-1530C. If the determined risk is substantially smaller than the specified requirement, the current accumulated hours and yearly usage hours are changed 80 and the above described analysis is repeated until a larger risk, substantially close to the specified requirement is found.

Once the calculated risk is substantially close to the specified requirement, the hours of usage until it is required to perform the first inspection is estimated 90. To demonstrate the benefits of inspection and repair, a two-inspection case is utilized. For the second inspection interval, an approximate 0.75 times the first inspection interval hours is used in one embodiment as an initial step to start this second analysis. Based on the results, the second inspection interval is modified 100 until all risks before a probability of detection (POD) inspection are less than the specified requirement (e.g., the 1.0E-7 level). Note that due to the extremely small risk, the resulting inspection intervals can be very sensitive.

One simple check procedure for the testing interval results is that POD should be increased most of the time. However, when a large POD is found, it is possible that the second POD will be less than the first one. Additionally, Inspection intervals should be reduced most of the time unless a large portion of crack size has been detected in the first interval. Risk should be increased faster in the second inspection interval because more hours are added to the platform, and the crack size (in the aircraft example) is always growing.

Figure 2:
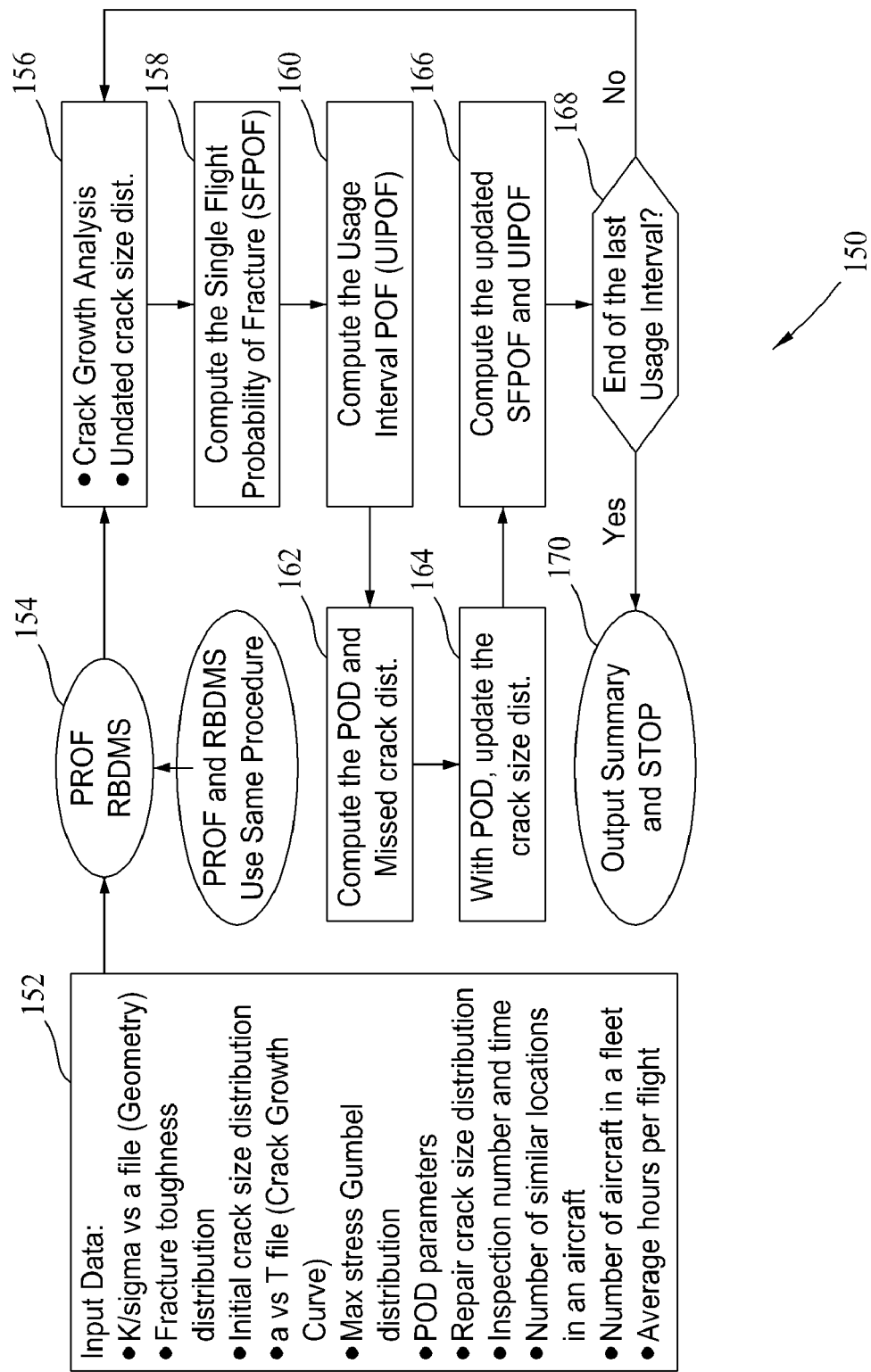
FIG. 2 is a flowchart that provides an illustration of the comprehensive risk assessment process that incorporates both a Risk-Based Design and Maintenance System (RB-DMS) and a PRObability of Fracture (PROF).code.

FIG. 2 is a flowchart 150 that provides a further illustration of the comprehensive RBDMS and PROF processes. More specifically, for the airframe example utilized herein, flowchart 150 includes a list of the input data 152 that might be input into a RBDMS process. Such input data includes K/sigma versus a file (geometry), a fracture toughness distribution, an initial crack size distribution, an a versus T file (a crack growth curve), a maximum stress Gumbel distribution, probability of detection parameters, repair crack size distribution, an inspection number and time, a number of similar locations on an aircraft, a number of aircraft in a fleet, and an average number of hours per aircraft flight.

Once this data is input into the comprehensive RBDMS and PROF process 154, a crack growth analysis and an updated crack size distribution 156 are utilized to compute 158 the single flight probability of fracture (SFPOF). A usage interval probability of failure (UIPOF) is also computed 160. A probability of detection (POD) and a distribution of missed cracks are computed 162. The crack size distribution is updated 164 with computed POD which allows both an updated SFPOF and an updated UIPOF to be computed 166. If it is determined that the RBDMS is at the end of its last usage cycle 168, an output summary is output 170, otherwise, an additional crack growth analysis and crack size distribution is commenced.

Figure 3:
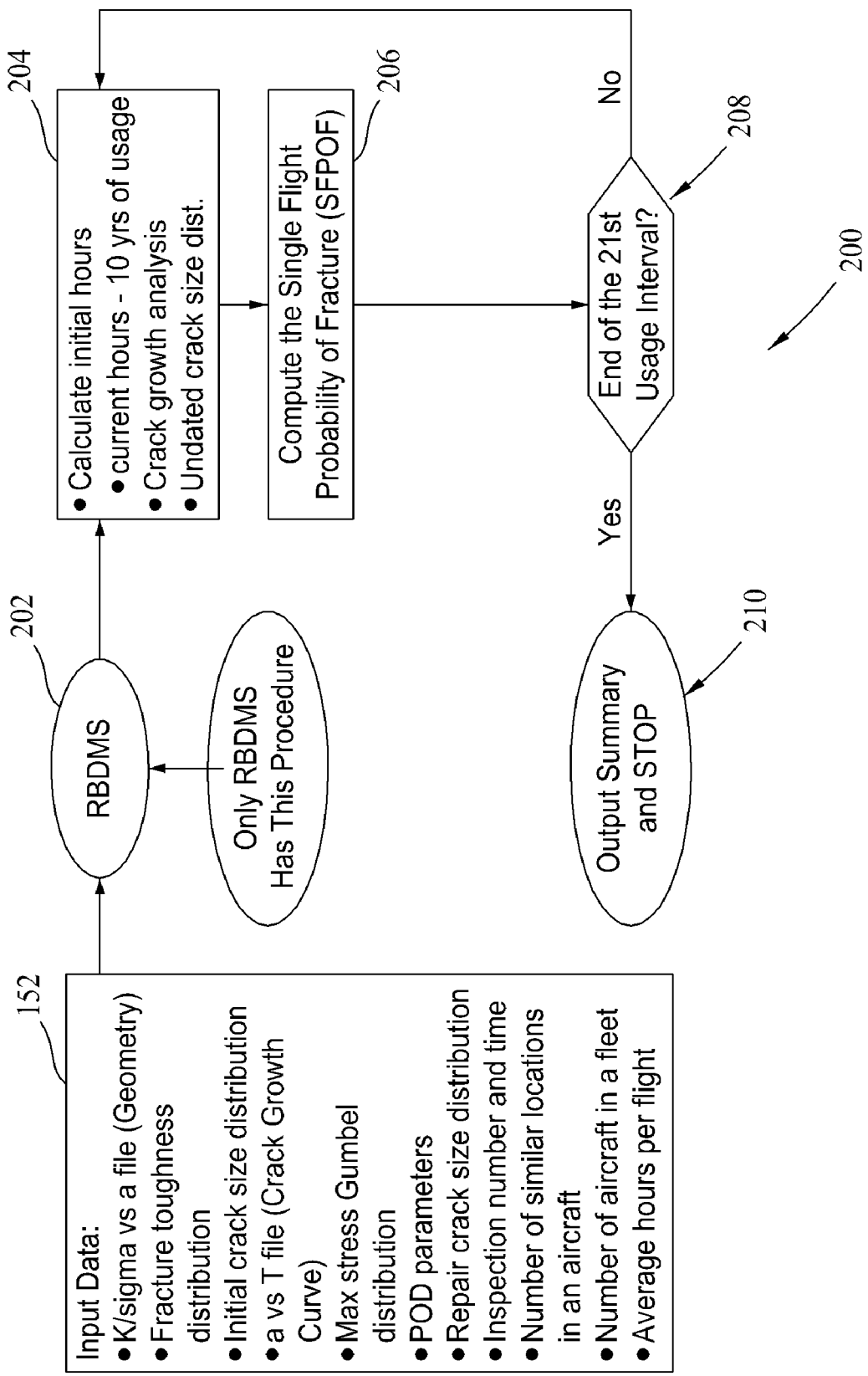
FIG. 3 is a flowchart that provides an illustration of a probabilistic risk assessment process that incorporates the RBDMS.

FIG. 3 is a flowchart 200 that illustrates a probabilistic risk analysis for a stand alone RBDMS system. The same input data 152 is used as inputs to the RBDMS process 202 which calculates 204 initial hours of usage based on the current usage hours over ten years of usage. A crack growth analysis and an updated crack size distribution are again utilized in the computation 206 of the single flight probability of fracture (SFPOF). If it is determined that the RBDMS is at the end of the $21^{st}$ usage cycle 208, an output summary is provided 210, and otherwise an additional crack growth analysis and crack size distribution is commenced.

Regarding incorporation of risk analysis into an inspection program, traditional aircraft structural integrity programs (ASIP) damage tolerance requirements use a set of design standards to determine the inspection and repair schedule. However, there is no information regarding risk of such decisions or consideration given to the sensitivity of influential factors such as fracture toughness, loads, or initial crack size. The statistical method incorporated in ASIPs may evaluate the risk of the traditional deterministic damage tolerance inspections but does not replace it. Because the risk analysis is supplementing the deterministic analysis, it becomes an additional step in a FSMP process. The analysis locations that show need for inspection in the near term, as established by the FSMP deterministic analysis, have risk analysis performed. Those locations that do not show need for inspections in the near term do not have risk analysis performed. The RBDMS method described herein is one method of performing such risk analysis, though other analysis tools (e.g., PROF III) may be used.

In setting up the RBDMS system, the risk associated with each deterministic analysis location that shows a need for inspection was calculated. These values were based on 'fleet average' aircraft usage at the date the deterministic analysis showed need for inspection. The risk was also calculated each year for approximately ten years prior to and ten years after the deterministic inspection date. A curve was fit to the data to establish an equation representing the risk data over time. It was found that a power equation was the best fit. In some cases, the calculated risk was very low at the deterministic inspection time and additional risk analyses were performed to capture a more accurate representation of the risk. The equation was then used to establish the risk for each aircraft taking into account their individual usage and historical severity. This was done, in one embodiment, by integrating the risk data into a spreadsheet program along with the deterministic FSMP data, historical usage data, and PDM schedule for each individual aircraft. A set of spreadsheet macros calculated the risk and formatted the data into tables for use in the FSMP.

One influential parameter in the RBDMS-based risk analyses was the initial crack size distribution. The only truly accurate way of determining the initial crack distribution is to analyze structure during a teardown inspection. In cases where there is no teardown data available, assumptions are made regarding the initial crack distribution. These assumptions are discussed in detail below.

By integrating Robust Importance Sampling Methodology (RISM) improvements with selected aging aircraft risk assessment process, as described with respect to FIG. 2, risk and POD for various problems are solved. Specifically, the proposed RISM method has shown a capability in calculating the extremely small probability of failure given nonlinear limit-state functions and irregular shape and large coefficient of variation distributions. To make the code more robust in producing consistent results, two major improvements were made:

In the first improvement, due to double-precision capability within the software code, it is not realistic to calculate the risk lower than 1.0E-16. Therefore, a flag was added to stop the computation when experiencing extremely small probability of failure cases (<1.E-16).

In the second improvement, the RISM method was configured to compute the smaller risk, but not configured to solve problems with larger risks, especially when risk >0.5. The software code simply does not work properly. To prevent inaccurate solutions from this software code, a flag was placed to remove unnecessary numerical errors when the risk is >0.01. Therefore, when the risk is calculated to be >0.01, the software code warns the user and recommends that the user either reduce the inspection time/hours or change the variable inputs.

With the above improvements, the RISM method is more robust and produces solutions in the range of 1.0E-16 to 1.0E-2. Further improvement to the RISM can be done by improving the initial crack size modeling technique. Currently, and in one embodiment, the range of initial crack size utilized is from $-6\sigma$ to $6\sigma$ (~1.0E-9 level). If the range is increased to a level of 1.0E-16, the accuracy may be improved, however computation is difficult due to double-precision capability and crack growth modeling issues.

In regard to generic crack size distribution, sizes of the cracks that are present in a structure are modeled in terms of a distribution of cracks, or equivalent cracks, in which it is postulated with some size even if the crack is of an undetectable size. This initiating crack size distribution has a significant influence on the risk calculation and is the most difficult information to obtain. There are several sources of data for characterizing this distribution, including in-service inspections data, teardown Inspections data, equivalent initial flaw size distribution, and time to crack initiation (TTCI) distribution.

Engineering judgment also can be utilized to create a distribution. For example, by using the following assumptions, an initial crack size distribution with proper selection of random variable types can be developed. Specifically, a first standard is that the mean of the distribution is a crack size of 0.0025 inches and the second standard is based on the deterministic damage tolerance 'rogue flaw' concept, or a 0.05-inch crack occurring once in a million.

Because of the significant effect of the initial crack size distribution on the risk calculations, however it is determined, sensitivity studies are conducted using the parameters of the distribution to develop a sense of the range of failure probabilities that are reasonable for the application. It is generally considered that the initial distribution is a lognormal or Weibull distribution. The PROF analyses provided other predetermined initial distributions.

For example, a first set of analyses used a distribution from PROF that combined lognormal and uniform distributions. This used the lognormal distribution to capture the smallest crack sizes and a very conservative uniform distribution at the larger crack sizes. This combination results in an unrealistic initial distribution and the consequent results behaved poorly. A 'sudden jump effect' was observed with this distribution where the risk was very low as time progressed and then increased rapidly.

A second set of analyses used a lognormal distribution based on two long-standing crack distribution standards. The first standard was that the mean of the distribution is a crack size of 0.0025 inches. The second standard was based on the deterministic damage tolerance 'rogue flaw' concept, or a 0.05-inch crack occurring once in a million. Results from this distribution behaved much better than those from the mixed distribution.

A third set of analyses used a predetermined Weibull distribution from the PROF software code. This distribution is derived from the teardown inspection results and it is probably the most representative of initial cracks though the distribution is less severe than the long-standing standards.

A fourth set of analyses used a Weibull distribution based on the long-standing crack distribution standards of 0.0025 inches for the mean and a 0.05-inch one in a million crack. This distribution was more conservative than the previously discussed Weibull distribution.

Except for the mixed distribution, results from the risk analyses behaved rationally. The lognormal and two Weibull initial crack distributions resulted in acceptable risk levels at the time of the deterministic inspection. The Weibull distribution based on the long-standing standards generally resulted in a more conservative risk, and this distribution was used in one FSMP risk assessment because of the uncertainties of the initial crack distribution on the analysis locations for the aircraft. The information provided in the FSMP should help the ASIP manager decide the most cost effective time to perform inspections while maintaining safety of flight. A database of these initial crack size distributions with sources identified is important task for future risk analyses.

The following paragraphs summarize key results for nine identified fatigue critical locations (FCLs) by using both the PROF III and RBDMS codes. As described above, two important analysis processes were proposed. The first process is to perform a risk assessment for 21 years of usage and the second process is to perform a risk assessment with consideration of inspection and repair. The results summarized focus on the results with consideration of two inspections with POD parameters (median=0.06, steepness=0.184, smallest detectable size=1.0E-20, and Probability of Inspection=1.0).

For FCL #1, deterministic inspection intervals were calculated and used to compare with the inspection intervals determined based on a 1.0E-7 risk assessment requirement. Two different initial crack size distributions were used for this FCL as shown in Table 1.

TABLE 1

| FCL #1 Inspection Interval Results | | | | | | |
|---|---|---|---|---|---|---|
| FCL Name | $1^{st}$ Inspection | SFPOF | POD (%) | $2^{nd}$ Inspection | SFPOF | POD (%) |
| PROF Wei(0.575, 0.0002187) | 25000 | 2.2E-8 | 0.34 | 12000 | 2.37E-8 | 0.49 |
| RBDMS Wei(0.575, 0.0002187) | 18500 | 8.15E-8 | 0.05 | 9000 | 8.13E-8 | 0.2 |
| RBDMS Log/Uniform mixed | 14430 | 1.98E-9 | 0.081 | 9000 | 6.53E-8 | 0.087 |

Figure 4:
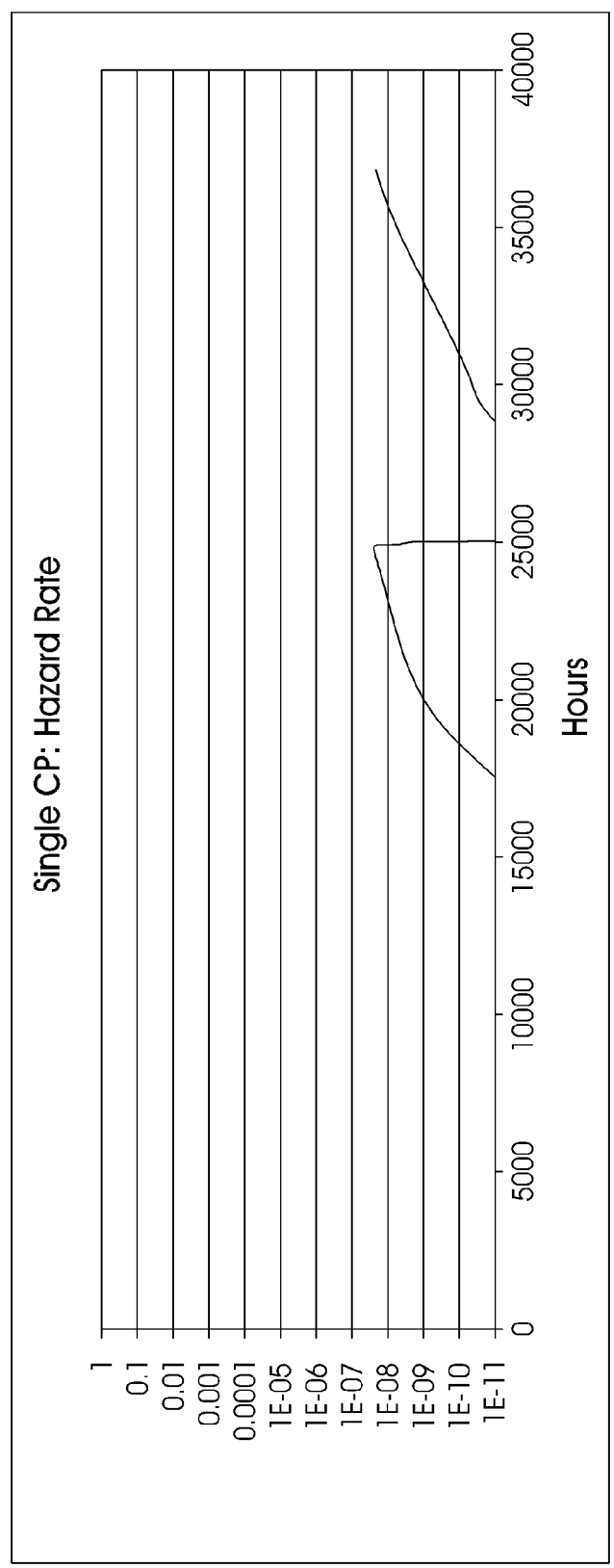
FIG. 4 is an illustration of a hazard rate function for a first fatigue critical location and a first inspection interval.
Figure 5:
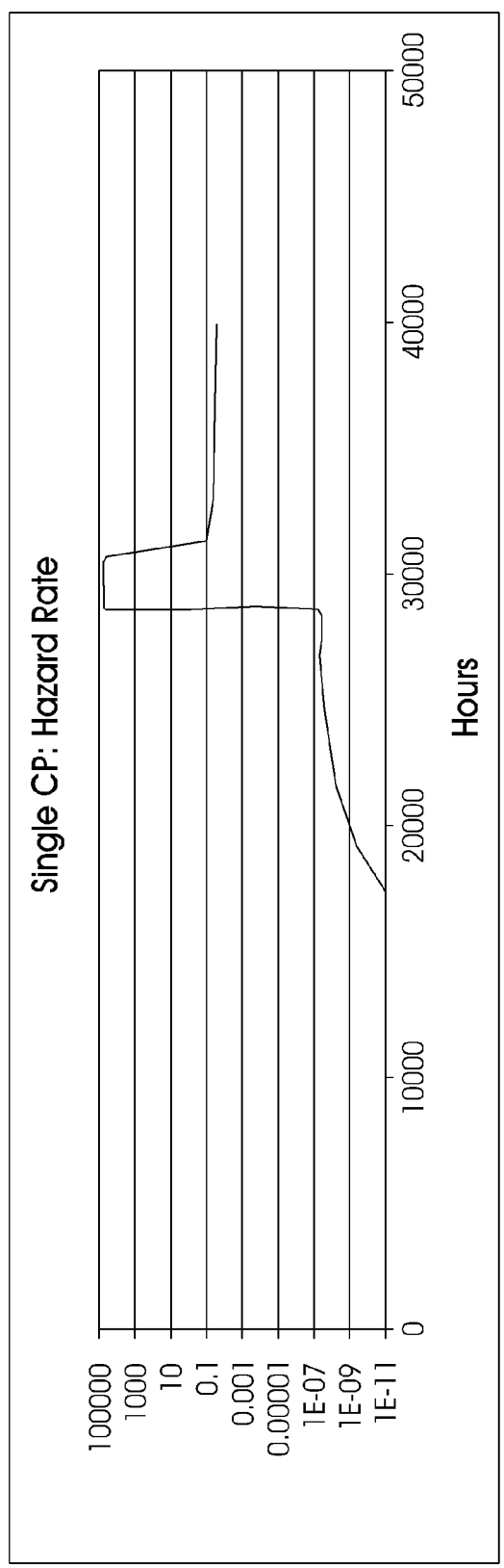
FIG. 5 is an illustration of a hazard rate function for the first fatigue critical location and a second inspection interval.

As shown, the RBDMS code produced smaller inspection intervals (or higher risk) than the PROF code. When using the lognormal/uniform mixed initial (Log (9.455E-4, 5.95744E-4) with 99.9%, Uniform (0, 0.05) with 0.1%), the RBDMS code produced even smaller inspection intervals. The log/uniform mixed initial was not solved by using the PROF code because several runtime errors were found for this case. In fact, for the Weibull initial input, several bugs in the PROF code were found as well. For example, when running the case with (25000, 12000), normal results were found as shown in FIG. 4 however, when choosing the case with (28000, 12000), the hazard rate function or failure rate had a numerical error as shown in FIG. 5.

For FCL #2, deterministic inspection intervals (9729, 9729) were calculated and used to compare with the inspection intervals determined based on a 1.0E-7 risk assessment requirement. Two different initial crack size distributions were used for this FCL as shown in Table 2.

TABLE 2

| FCL #2 Inspection Interval Results | | | | | | |
|---|---|---|---|---|---|---|
| FCL Name | $1^{st}$ Inspection | SFPOF | POD (%) | $2^{nd}$ Inspection | SFPOF | POD (%) |
| PROF Wei(0.575, 0.0002187) | 1000000 | <<1.0E-7 | | | | |

TABLE 2-continued

| | FCL #2 Inspection Interval Results | | | | | |
|---|---|---|---|---|---|---|
| FCL Name | 1$^{st}$ Inspection | SFPOF | POD (%) | 2$^{nd}$ Inspection | SFPOF | POD (%) |
| RBDMS Wei(0.575, 0.0002187) | 220000 | 9.02E−8 | 0.31E−4 | 80000 | 7.59E−8 | 0.63E−4 |
| RBDMS Log/Uniform mixed | 84000 | <1.0E−7 | 0.03 | 30000 | 5.08E−8 | 0.01 |

Figure 6:
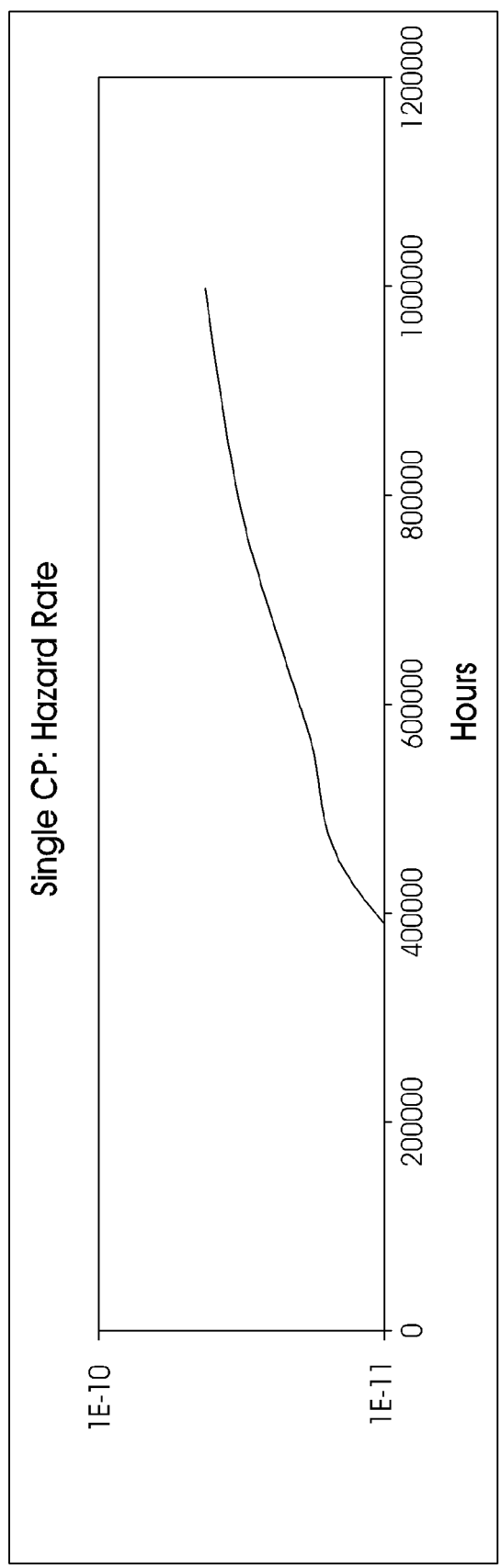
FIG. 6 is an illustration of a hazard rate function for a second fatigue critical location and a first inspection interval.

As shown, the RBDMS code produced smaller inspection intervals (or higher risk) than the PROF code. When using the lognormal/uniform mixed initial, the RBDMS code produced even smaller inspection intervals. The log/uniform mixed initial was not solved by using the PROF code because several runtime errors were found. In fact, for the Weibull initial input, the PROF code was not able to produce risk higher than 1.0E−7. As shown in FIG. 6, the PROF III results case with 1000000 hours.

Figure 7:
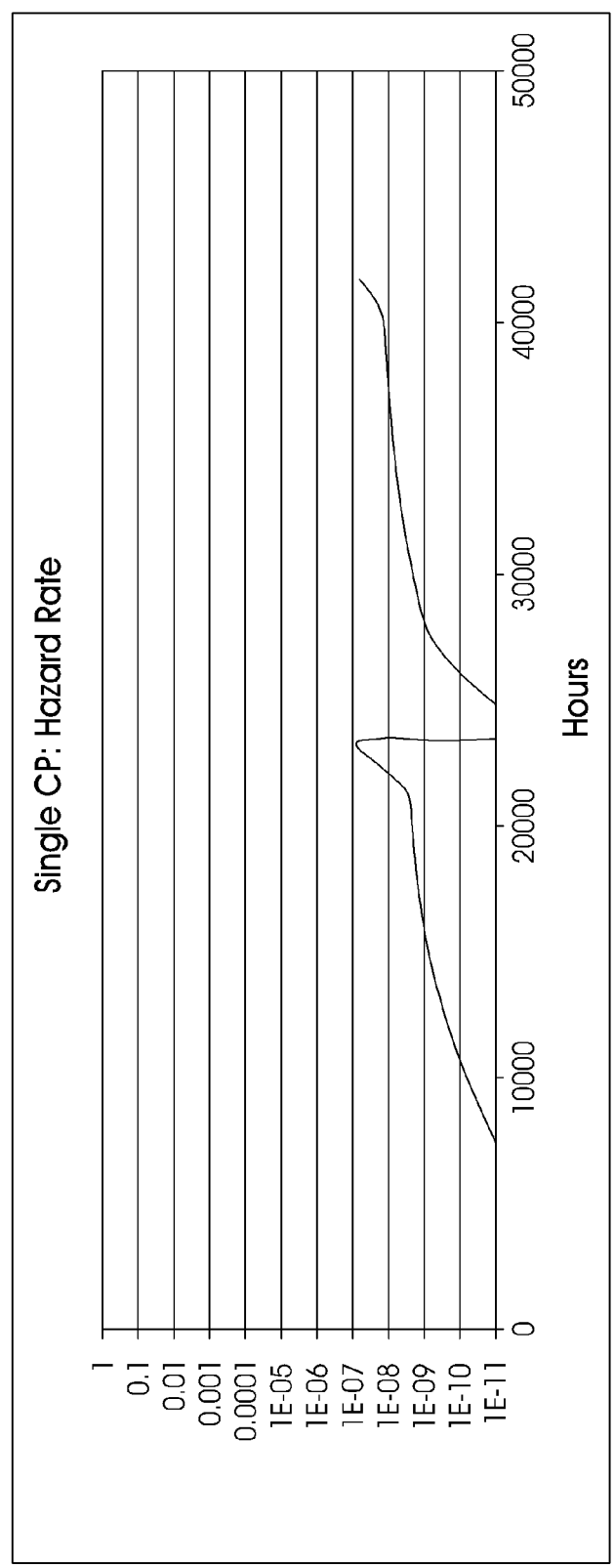
FIG. 7 is an illustration of a hazard rate function for a third fatigue critical location and a first inspection interval.
Figure 8:
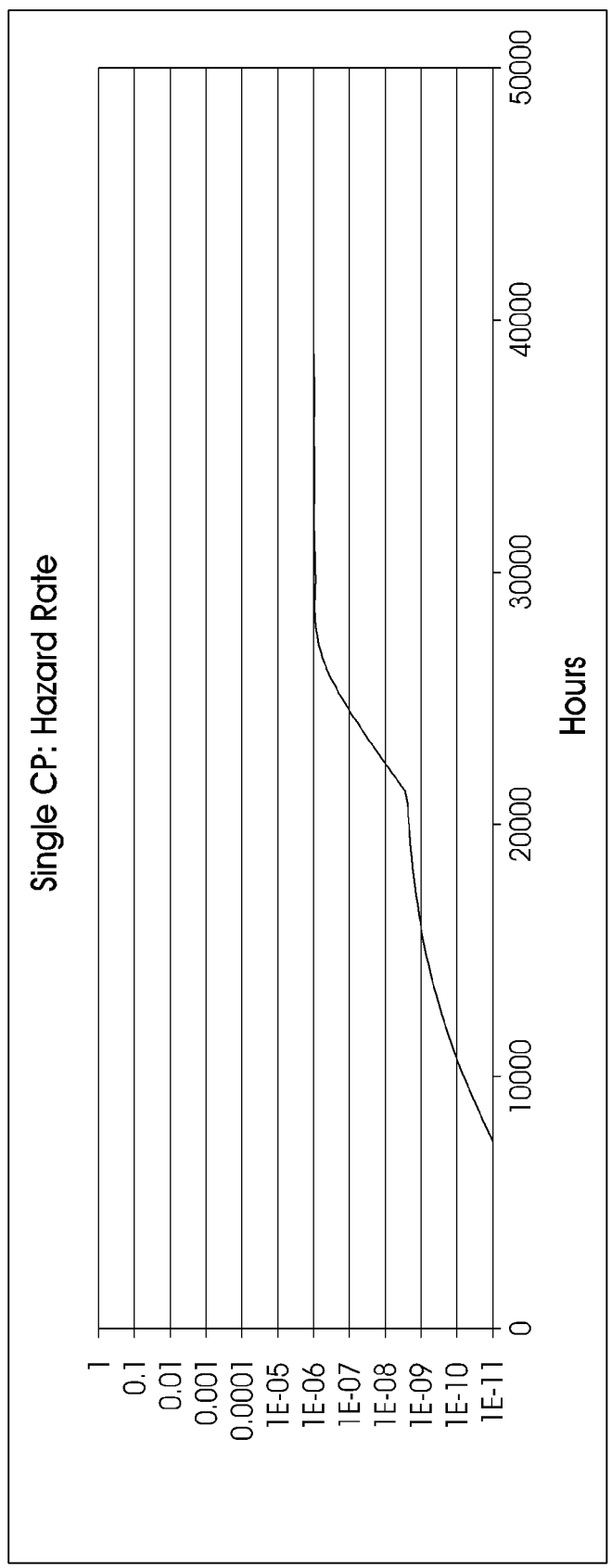
FIG. 8 is an illustration of a hazard rate function for the third fatigue critical location and a second inspection interval.

For FCL #3, deterministic inspection intervals (5000, 5000) were calculated and used to compare with the inspection intervals determined based on a 1.0E−7 risk assessment requirement. Four different initial crack size distributions were used for this FCL as shown in Table 3.

the RBDMS code produced even smaller inspection intervals. Also notice that log/uniform mixed initial was not solved by using the PROF code because several runtime errors were found for this case. In fact, for the Weibull initial input, several bugs were found as well. For example, when the case is run with (23000, 18000), normal results are provided as shown in FIG. 7. However, when the case is run with (40000), the hazard rate function became constant for a long period of time as shown in FIG. 8. Given crack size growing continuously, it is not accurate to have a constant risk for a period of

TABLE 3

| | FCL #3 Inspection Interval Results | | | | | |
|---|---|---|---|---|---|---|
| FCL Name | 1$^{st}$ Inspection | SFPOF | POD (%) | 2$^{nd}$ Inspection | SFPOF | POD (%) |
| PROF Wei(0.575, 0.0002187) | 23000 | 6.64E−8 | 1.84 | 18000 | 5.24E−8 | 3.87 |
| RBDMS Wei(0.575, 0.0002187) | 11500 | 5.20E−8 | 0.41 | 7000 | 3.61E−8 | 1.11 |
| RBDMS Log/Uniform mixed | 8500 | 7.73E−8 | 0.136 | 7800 | 6.24E−8 | 0.877 |
| RBDMS Wei(0.998855, 0.00361) | 8500 | 8.9E−8 | 22.23 | 6000 | 8.53E−8 | 34.25 |
| RBDMS Log((2.955E−3, 1.862E−3)) | 9500 | 5.198E−8 | 11.81 | 6000 | 5.623E−8 | 28.89 |

As shown, the additional two distributions were based on the traditional deterministic approach's assumptions for the initial crack size: 0.05 inches crack at 0.999999 level and 0.0025 inches crack at 50% level. The RBDMS code produced smaller inspection intervals (or higher risk) than the PROF code. When using the lognormal/uniform mixed, Weibull(0.998855, 0.00361) or Log (2.955E−3, 1.862E−3), time. It should be a monotonically increased function unless an inspection and repair process have been performed as shown in FIG. 7.

For FCL #4, deterministic inspection intervals (8325, 8325) were calculated and used to compare with the inspection intervals determined based on a 1.0E−7 risk assessment requirement. Two different initial crack size distributions were used for this FCL as shown in Table 4.

TABLE 4

| | FCL #4 Inspection Interval Results | | | | | |
|---|---|---|---|---|---|---|
| FCL Name | 1$^{st}$ Inspection | SFPOF | POD (%) | 2$^{nd}$ Inspection | SFPOF | POD (%) |
| PROF Wei(0.575, 0.0002187) | 30000 | 2.4E−8 | 0.823 | 18000 | 4.86E−8 | 1.895 |
| RBDMS Wei(0.575, 0.0002187) | 24500 | 6.42E−8 | 0.45 | 17000 | 8.14E−8 | 1.451 |
| RBDMS Log/Uniform mixed | 19500 | 2.89E−8 | 0.165 | 17500 | 8.24E−8 | 1.377 |

Figure 9:
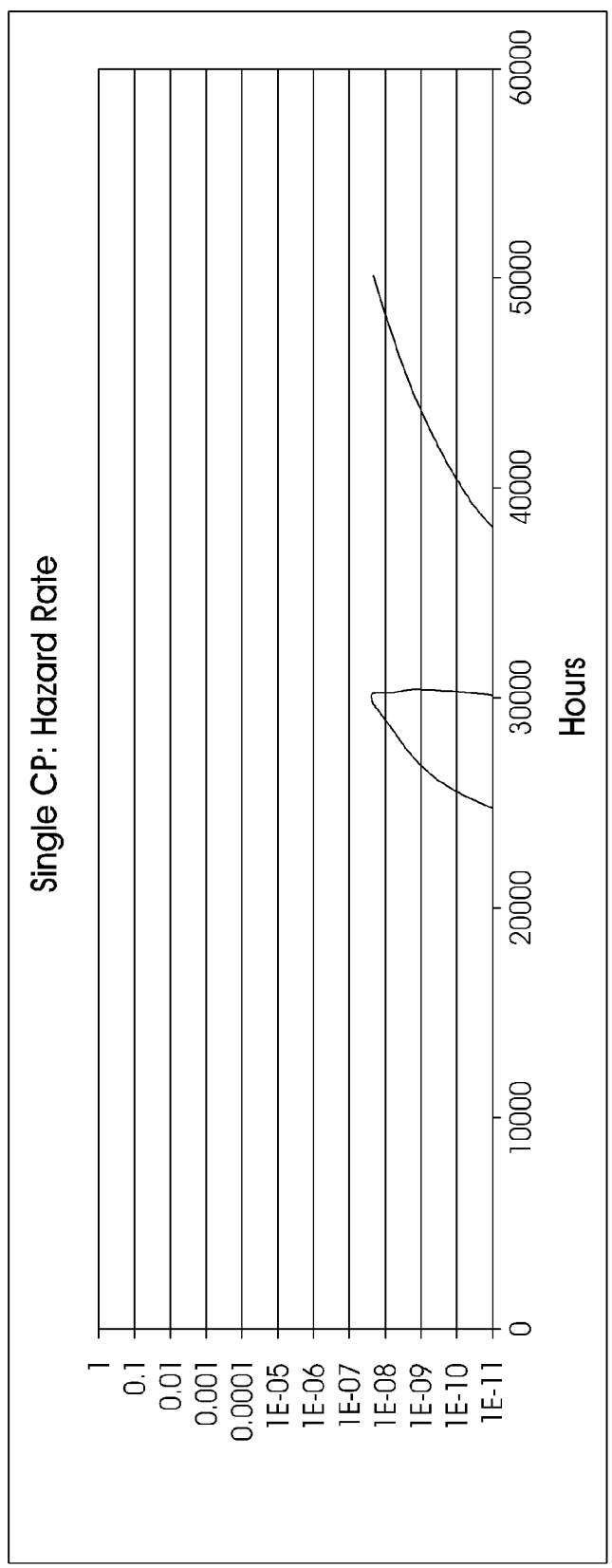
FIG. 9 is an illustration of a hazard rate function for a fourth fatigue critical location and a first inspection interval.
Figure 10:
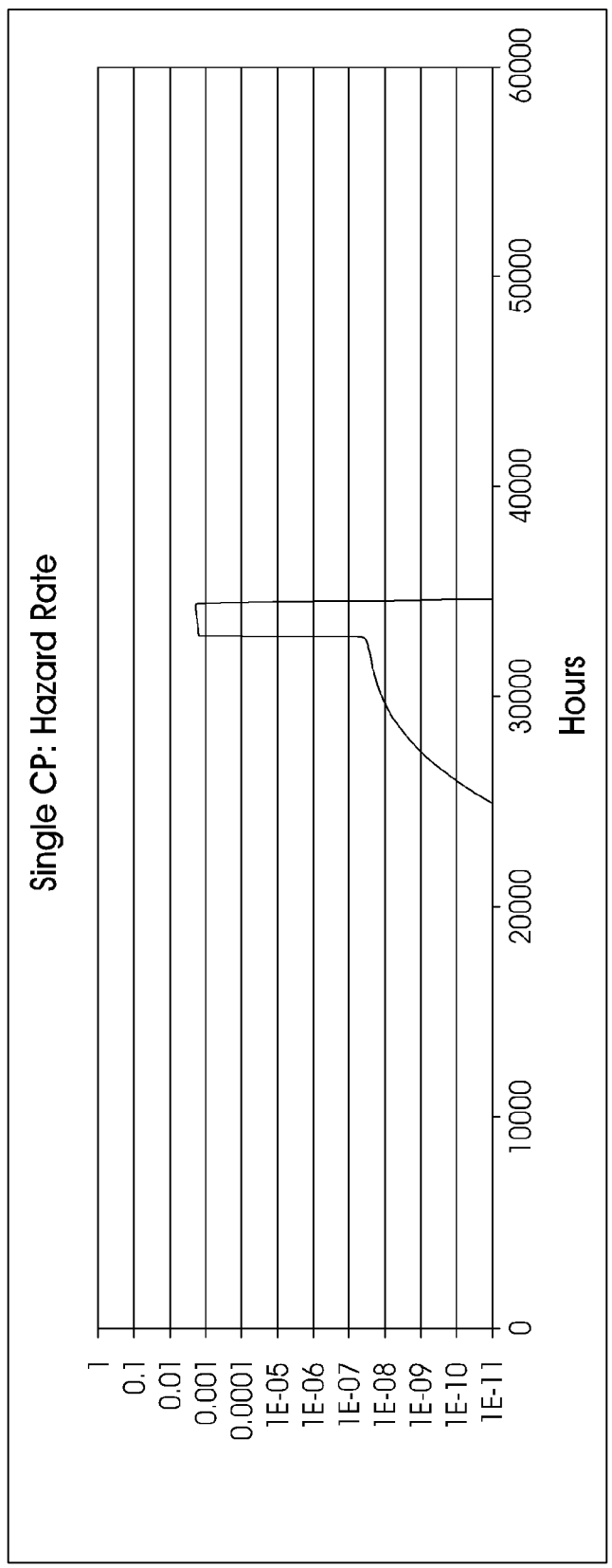
FIG. 10 is an illustration of a hazard rate function for the fourth fatigue critical location and a second inspection interval.

As shown, the RBDMS code produced smaller inspection intervals (or higher risk) than the PROF code. When using the lognormal/uniform mixed initial, the RBDMS code produced even smaller inspection intervals. Also notice that log/uniform mixed initial was not solved by using the PROF code because several runtime errors were found for this case. In fact, for the Weibull initial input, several bugs were found as well. For example, when running the case with (30000, 18000), normal results were found as shown in FIG. 9. However, when choosing the case with (32000, 18000), the hazard rate function or failure rate had a numerical error as shown in FIG. 10.

For FCL #5, deterministic inspection intervals (7938, 7938) were calculated and used to compare with the inspection intervals determined based on a 1.0E-7 risk assessment requirement. Two different initial crack size distributions were used for this FCL as shown in Table 5.

TABLE 5

FCL #5 Inspection Interval Results

| FCL Name | $1^{st}$ Inspection | SFPOF | POD (%) | $2^{nd}$ Inspection | SFPOF | POD (%) |
|---|---|---|---|---|---|---|
| PROF Wei(0.575, 0.0002187) | 28000 | 5.62E−8 | 0.445 | 15000 | 5.85E−8 | 0.827 |
| RBDMS Wei(0.575, 0.0002187) | 19500 | 5.90E−8 | 0.0758 | 11000 | 6.38E−8 | 0.367 |
| RBDMS Log/Uniform mixed | 15850 | <1.0E−7 | 0.085 | 11500 | 6.08E−8 | 0.171 |

Figure 11:
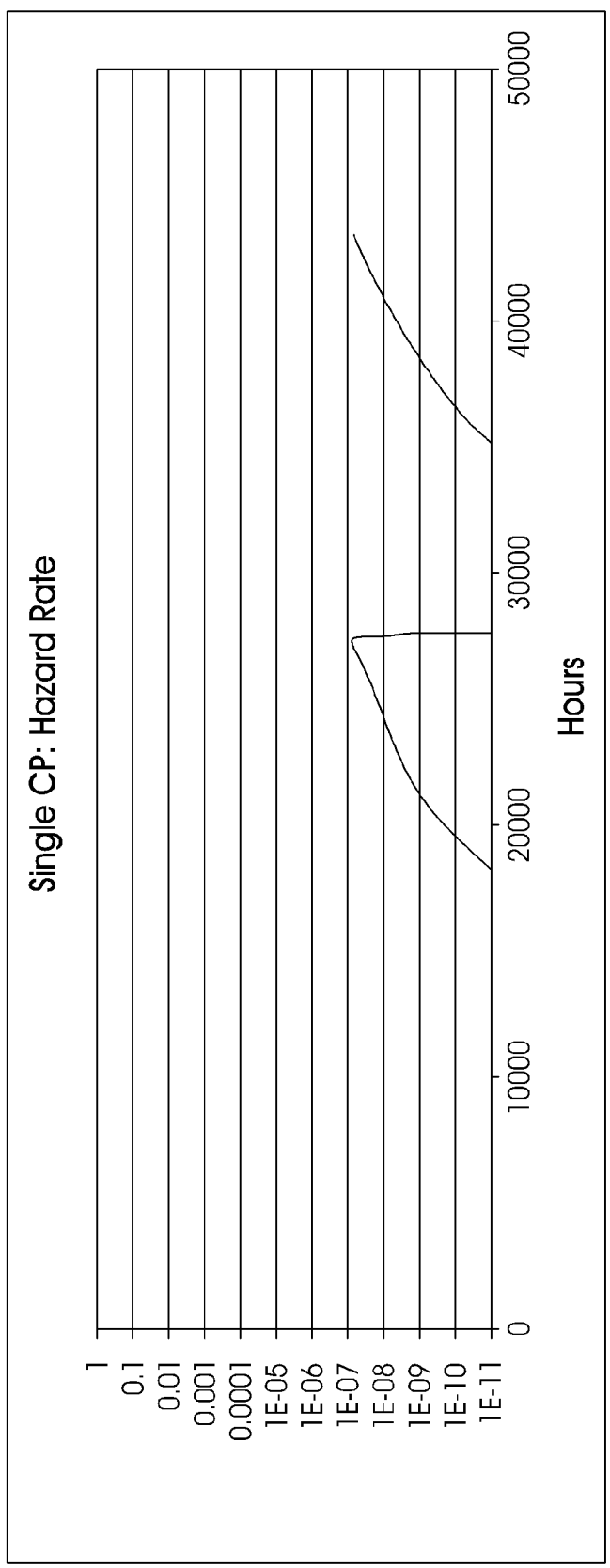
FIG. 11 is an illustration of a hazard rate function for a fifth fatigue critical location and a first inspection interval.
Figure 12:
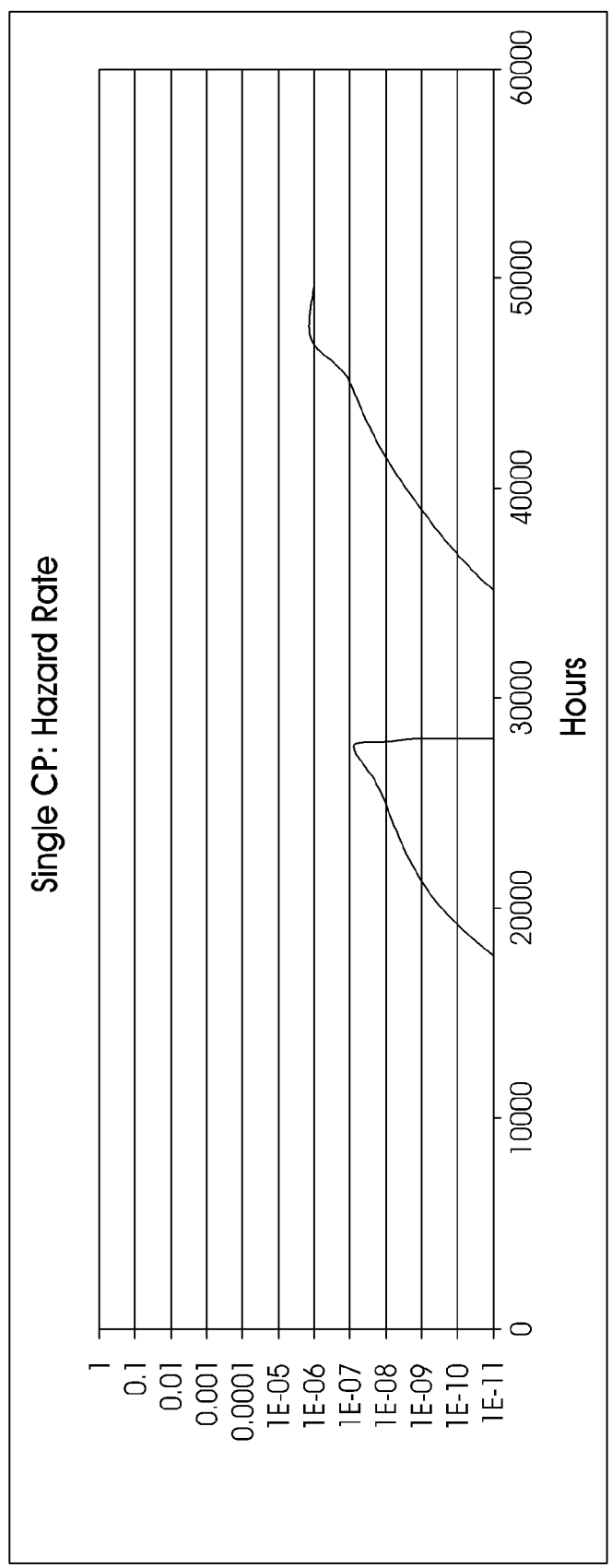
FIG. 12 is an illustration of a hazard rate function for the fifth fatigue critical location and a second inspection interval.

As shown, the RBDMS code produced smaller inspection intervals (or higher risk) than the PROF code. When using the lognormal/uniform mixed initial, the RBDMS code produced even smaller inspection intervals. Also notice that log/uniform mixed initial was not solved by using the PROF code because several runtime errors were found for this case. In fact, for the Weibull initial input, several bugs were found as well. For example, when running the case with (28000, 15000), normal results were found as shown in FIG. 11. However, when choosing the case with (28000, 20000), the code produced constant or reduced hazard rate function or failure rate as shown in FIG. 12.

For FCL #6, deterministic inspection intervals (11133, 11133) were calculated and used to compare with the inspection intervals determined based on a 1.0E-7 risk assessment requirement. Four different initial crack size distributions were used for this FCL as shown in Table 6.

TABLE 6

FCL #6 Inspection Interval Results

| FCL Name | $1^{st}$ Inspection | SFPOF | POD (%) | $2^{nd}$ Inspection | SFPOF | POD (%) |
|---|---|---|---|---|---|---|
| PROF Wei(0.575, 0.0002187) | 28000 | 6.62E−8 | 0.445 | 15000 | 5.86E−8 | 0.827 |
| RBDMS Wei(0.575, 0.0002187) | 24500 | 6.84E−8 | 0.729 | 17500 | 6.68E−8 | 2.021 |
| RBDMS Log/Uniform mixed | 20000 | 7.11E−8 | 0.313 | 18000 | 8.63E−8 | 2.62 |
| RBDMS Wei(0.998855, 0.00361) | 20000 | 5.36E−8 | 31.58 | 15000 | 5.48E−8 | 44.81 |
| RBDMS Log((2.955E−3, 1.862E−3)) | 22000 | 9.315E−8 | 23.1 | 15000 | 4.56E−8 | 46.89 |

Figure 13:
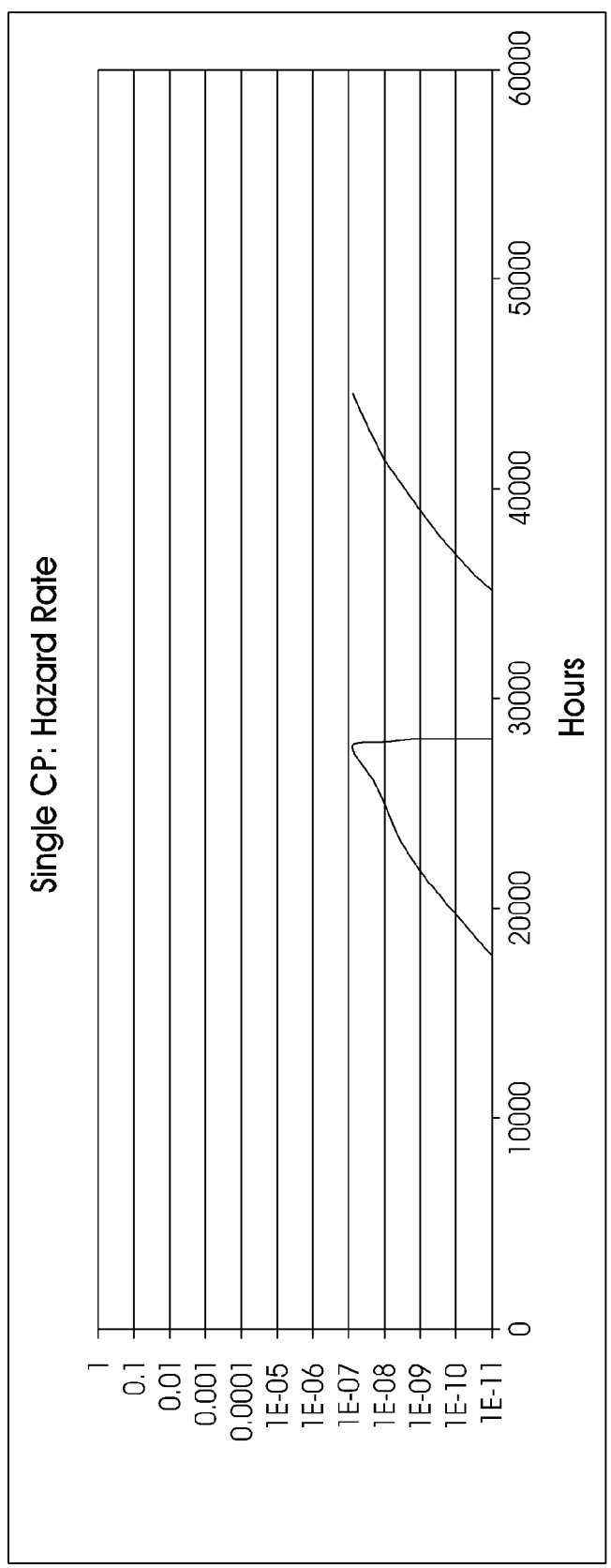
FIG. 13 is an illustration of a hazard rate function for a sixth fatigue critical location and a first inspection interval.

As shown, the additional two distributions were based on the traditional assumptions for initial crack size: 0.05 inches crack at 0.999999 level and 0.0025 inches crack at 50% level. The RBDMS code produced smaller inspection intervals (or higher risk) than the PROF code. When using the lognormal/uniform mixed, Weibull(0.998855, 0.00361) or Lognormal (2.955E-3, 1.862E-3), the RBDMS code produced even smaller inspection intervals. Also notice that log/uniform mixed initial was not solved by using the PROF code because several runtime errors were found for this case. In fact, for the Weibull initial input, several bugs were found as well. For example, when running the case with (28000, 15000), normal results were found as shown in FIG. 13. However, when choosing the case with (30000, 15000), a numerical error occurred and program stopped.

For FCL #7, deterministic inspection intervals (11423, 11423) were calculated and used to compare with the inspection intervals determined based on a 1.0E-7 risk assessment requirement. Two different initial crack size distributions were used for this FCL as shown in Table 7.

TABLE 7

| | FCL #7 Inspection Interval Results | | | | | |
|---|---|---|---|---|---|---|
| FCL Name | $1^{st}$ Inspection | SFPOF | POD (%) | $2^{nd}$ Inspection | SFPOF | POD (%) |
| PROF Wei(0.575, 0.0002187) | 32000 | 3.31E-8 | 0.658 | 20000 | 4.29E-8 | 1.645 |
| RBDMS Wei(0.575, 0.0002187) | 26000 | 8.725E-8 | 0.38 | 17000 | 5.248E-8 | 1.08 |
| RBDMS Log/Uniform mixed | 22700 | <1.0E-7 | 0.178 | 17500 | 5.0E-8 | 1.014 |

Figure 14:
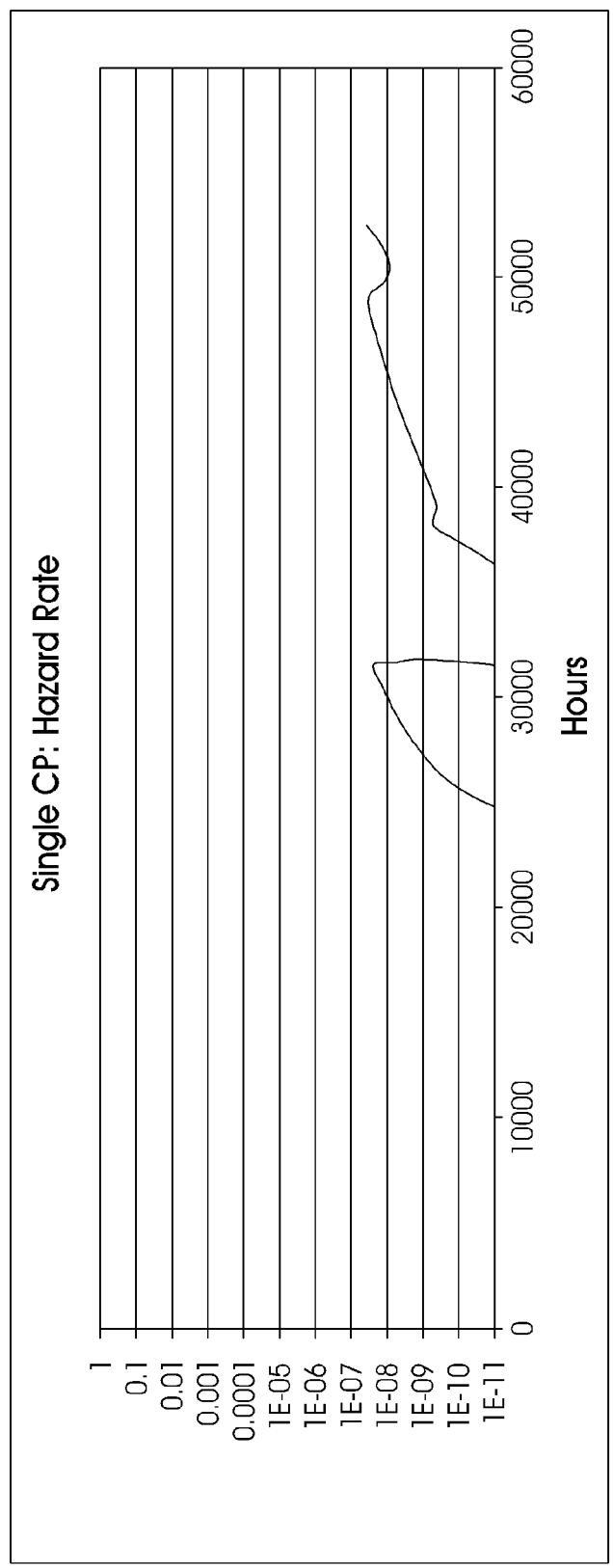
FIG. 14 is an illustration of a hazard rate function for a seventh fatigue critical location and a first inspection interval.
Figure 15:
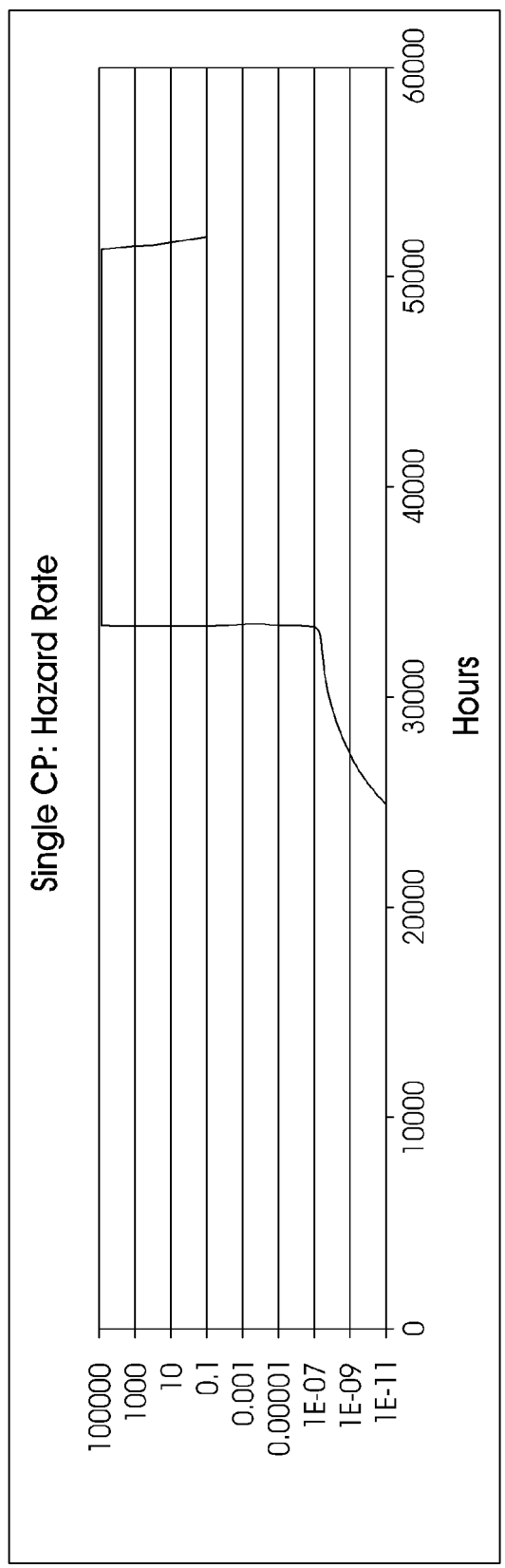
FIG. 15 is an illustration of a hazard rate function for the seventh fatigue critical location and a second inspection interval.

As shown, the RBDMS code produced smaller inspection intervals (or higher risk) than the PROF code. When using the lognormal/uniform mixed initial, the RBDMS code produced even smaller inspection intervals. Also notice that log/uniform mixed initial was not solved by using the PROF code because several runtime errors were found for this case. In fact, for the Weibull initial input, several bugs were found as well. For example, when running the case with (32000, 20000), normal results were found as shown in FIG. 14. However, when choosing the case with (33000, 20000), the hazard rate function or failure rate had a numerical error as shown in FIG. 15.

For FCL #8, deterministic inspection intervals (10310, 10310) were calculated and used to compare with the inspection intervals determined based on a 1.0E-7 risk assessment requirement. Two different initial crack size distributions were used for this FCL as shown in Table 8.

TABLE 8

| | FCL #8 Inspection Interval Results | | | | | |
|---|---|---|---|---|---|---|
| FCL Name | $1^{st}$ Inspection | SFPOF | POD (%) | $2^{nd}$ Inspection | SFPOF | POD (%) |
| PROF Wei(0.575, 0.0002187) | 58000 | 1.02E-7 | 0.34 | 65000 | 8.348E-8 | 0.49 |
| RBDMS Wei(0.575, 0.0002187) | 26000 | 8.29E-8 | 0.0267 | 14800 | 6.87E-8 | 0.135 |
| RBDMS Log/Uniform mixed | 20590 | 1.98E-8 | 0.0787 | 15000 | 7.62E-8 | 0.793 |

Figure 16:
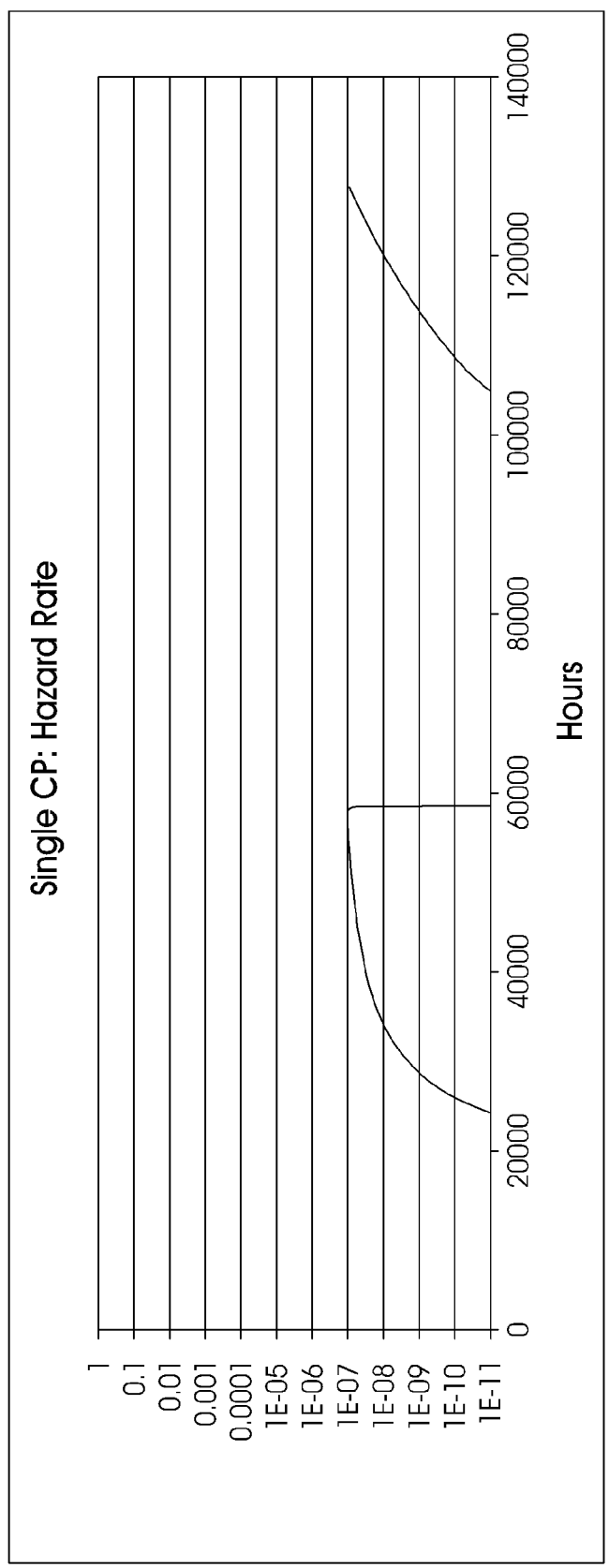
FIG. 16 is an illustration of a hazard rate function for an eighth fatigue critical location and a first inspection interval.
Figure 17:
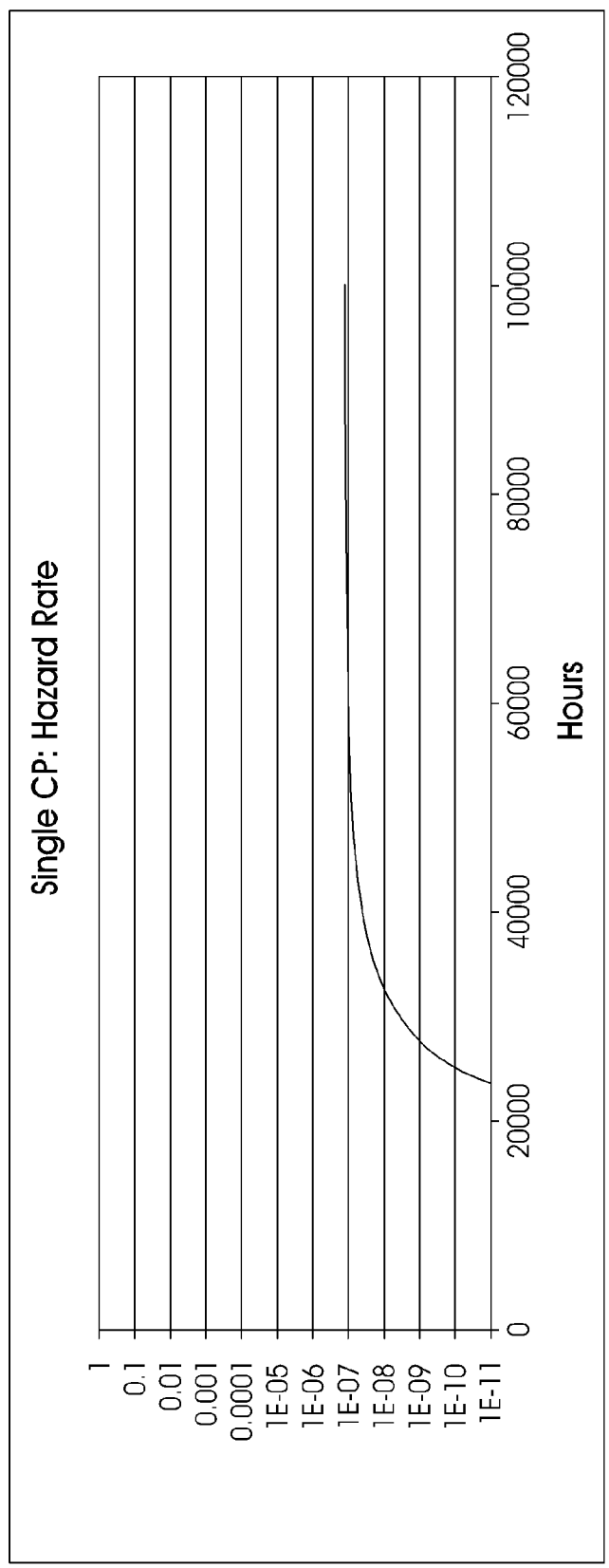
FIG. 17 is an illustration of a hazard rate function for the eighth fatigue critical location and a second inspection interval.

As shown, the RBDMS code produced smaller inspection intervals (or higher risk) than the PROF code. When using the lognormal/uniform mixed initial, RBDMS produced even smaller inspection intervals. Also notice that log/uniform mixed initial was not solved by using the PROF code because several runtime errors were found for this case. In fact, for the Weibull initial input, several bugs were found as well. For example, when running the case with (58000, 65000), normal results were found as shown in FIG. 16. However, when choosing the case with (100000), the hazard rate function or failure rate had produced a constant failure rate again as shown in FIG. 17.

For FCL #9, deterministic inspection intervals (14134, 14134) were calculated and used to compare with the inspection intervals determined based on a 1.0E-7 risk assessment requirement. Four different initial crack size distributions were used for this FCL as shown in Table 9.

TABLE 9

FCL #9 Inspection Interval Results

| FCL Name | $1^{st}$ Inspection | SFPOF | POD (%) | $2^{nd}$ Inspection | SFPOF | POD (%) |
|---|---|---|---|---|---|---|
| PROF Wei(0.575, 0.0002187) | 45000 | 9.36E−8 | 2.3E−5 | 37900 | 1.3E−7 | 1.984 |
| RBDMS Wei(0.575, 0.0002187) | 31000 | 5.77E−8 | 0.2645 | 24500 | 4.15E−8 | 0.9624 |
| RBDMS Log/Uniform mixed | 28000 | 2.19E−8 | 0.147 | 25000 | 8.6E−8 | 0.873 |
| PROF Wei(0.998855, 0.00361) | 29500 | 2.41E−8 | 24.80 | 25000 | 4.98E−8 | 38.74 |
| RBDMS Wei(0.998855, 0.00361) | 27300 | 6.07E−8 | 22.65 | 23700 | 7.50E−8 | 37.18 |
| RBDMS Log((2.955E−3, 1.862E−3)) | 27300 | 2.43E−8 | 9.37 | 23700 | 4.94E−8 | 30.18 |

Figure 18:
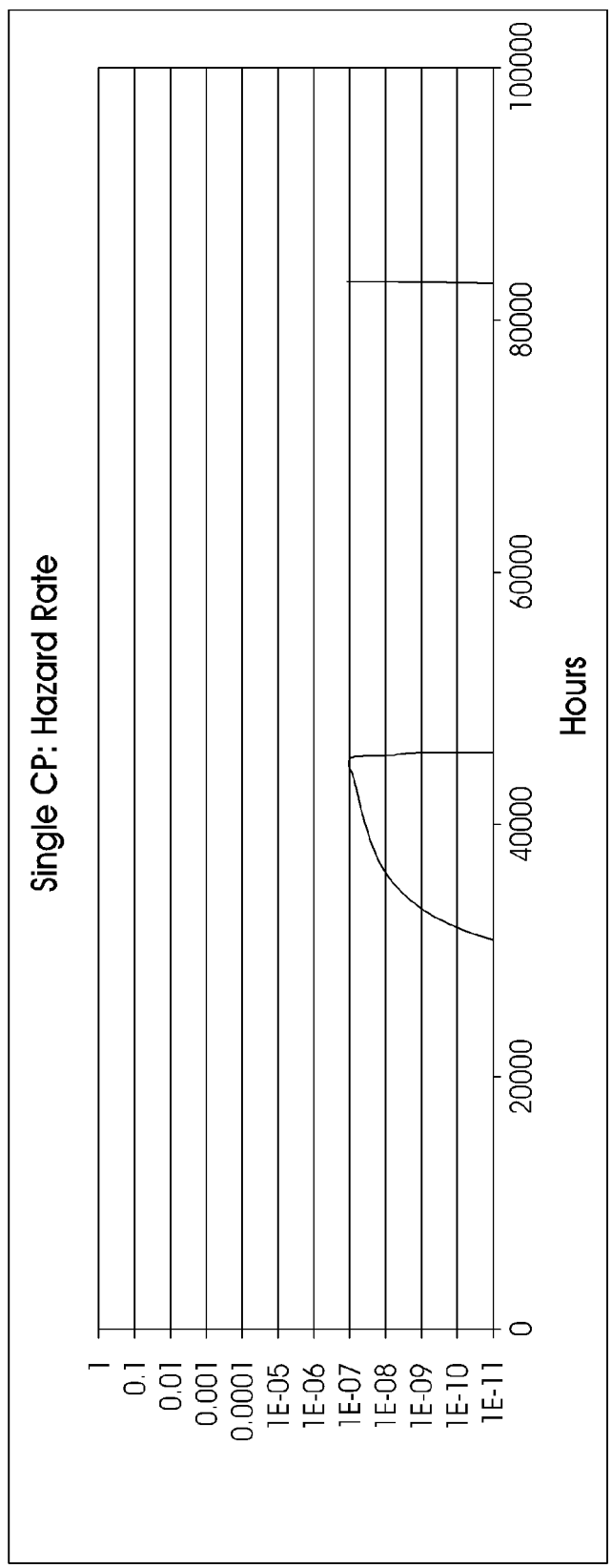
FIG. 18 is an illustration of a hazard rate function for a ninth fatigue critical location and a first inspection interval.
Figure 19:
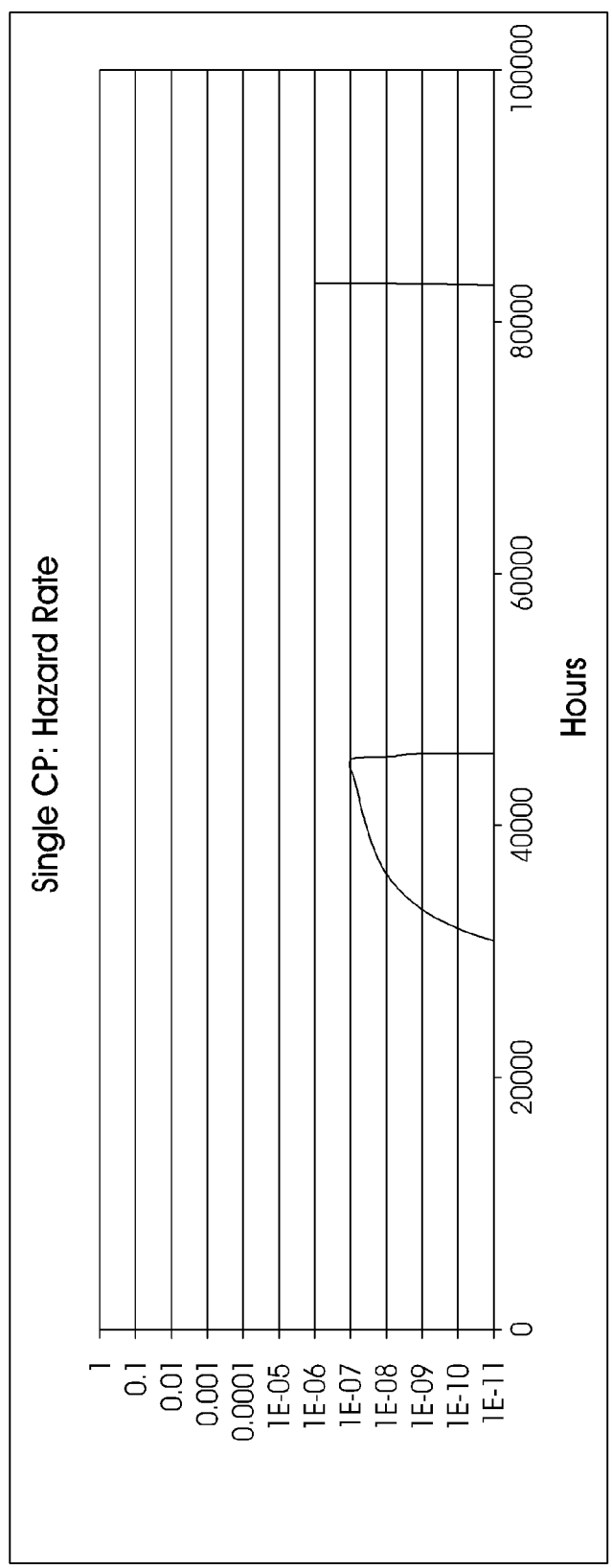
FIG. 19 is an illustration of a hazard rate function for the ninth fatigue critical location and a second inspection interval.

As shown, the additional two distributions were based on the traditional assumptions for initial crack size: 0.05 inches crack at 0.999999 level and 0.0025 inches crack at 50% level. The RBDMS code produced smaller inspection intervals (or higher risk) than the PROF code. When using the lognormal/uniform mixed, Weibull(0.998855, 0.00361) or Lognormal (2.955E-3, 1.862E-3), the RBDMS code produced even smaller inspection intervals. Also notice that log/uniform mixed initial was not solved by using the PROF code because several runtime errors were found for this case. In fact, for the Weibull initial input, several bugs were found as well. For example, when running the case with (45000, 37900), somewhat normal results were found as shown in FIG. 18 but with very steep increase of failure within a short period of time. The same observation can be found in the case with (45000, 39000) as shown in FIG. 19.

Figure 20:
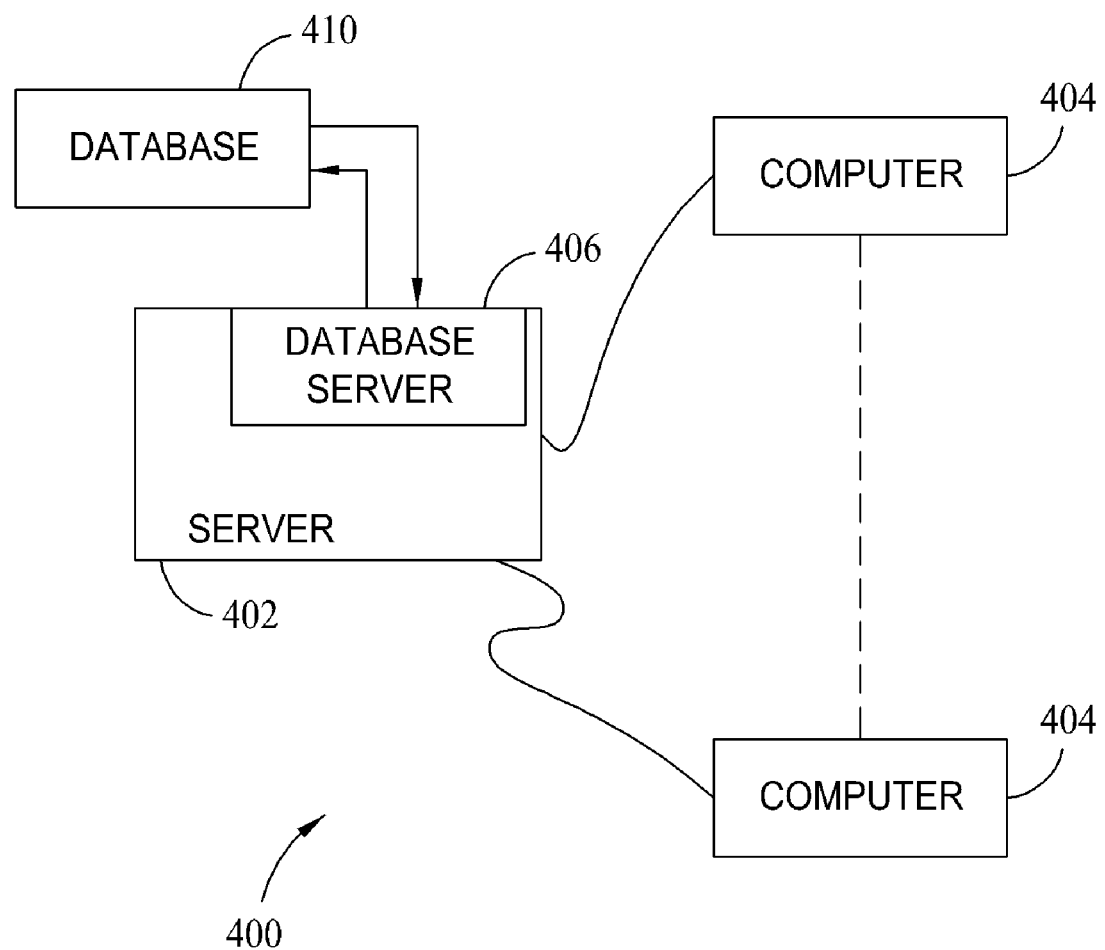
FIG. 20 is a system diagram.

FIG. 20 is a simplified block diagram of an exemplary system 400 in accordance with one embodiment of the present invention. In one embodiment, system 400 is a computer system that includes a processing device used for running at least a portion of the RBDMS system as further described above. As further described computer system 400 incorporates a user interface through which an ability is provided to input at least a portion of the input data described above with respect to FIGS. 2 and 3. Through the user interface, a user is able to probabilities of fractures as described above.

More specifically, in the example embodiment, system 400 includes a server system 402, and a plurality of client subsystems, also referred to as client systems 404, connected to server system 402. In one embodiment, client systems 404 are computers including a web browser, such that server system 402 is accessible to client systems 404 using the Internet. Client systems 404 are interconnected to the Internet through many interfaces including a network, such as a local area network (LAN) or a wide area network (WAN), dial-in-connections, cable modems and special high-speed ISDN lines. Client systems 404 could be any device capable of interconnecting to the Internet including a web-based phone, personal digital assistant (PDA), or other web-based connectable equipment. A database server 406 is connected to a database 410 containing information on a variety of matters, as described below in greater detail. In one embodiment, centralized database 410 is stored on server system 402 and can be accessed by potential users at one of client systems 404 by logging onto server system 402 through one of client systems 404. In an alternative embodiment, database 410 is stored remotely from server system 402 and may be non-centralized.

Figure 21:
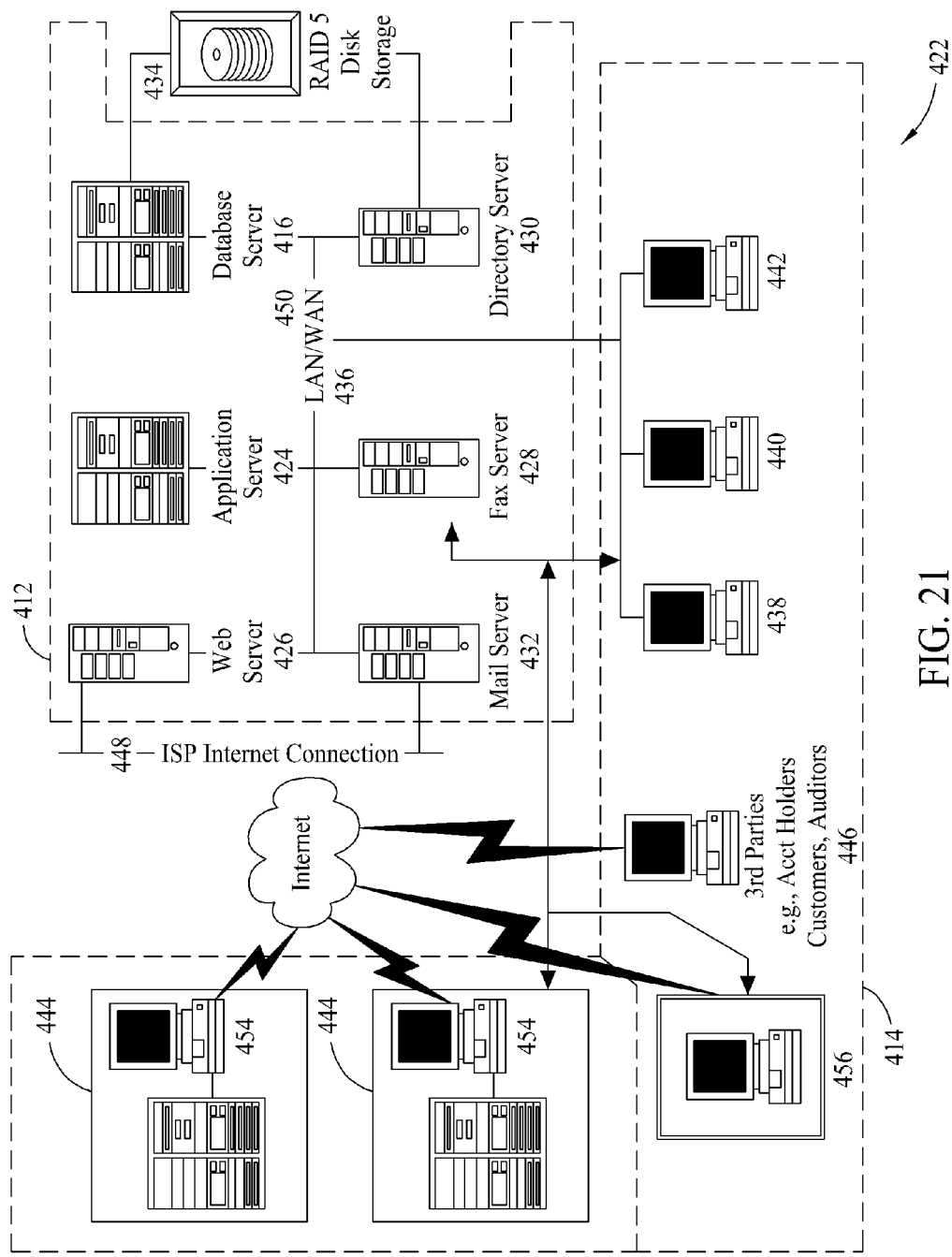
FIG. 21 is an expanded block diagram of one embodiment for a server architecture.

FIG. 21 is an expanded block diagram of an exemplary embodiment of a server architecture of a system 422 in accordance with one embodiment of the present invention. Certain components in system 422 may be identical to components of system 400 (shown in FIG. 20), and are identified in FIG. 21 using the same reference numerals. System 422 includes server system 412 and client systems 414. Server system 412 further includes database server 416, an application server 424, a web server 426, a fax server 428, a directory server 430, and a mail server 432. A disk storage unit 434 is coupled to database server 416 and directory server 430. Servers 416, 424, 426, 428, 430, and 432 are coupled in a local area network (LAN) 436. In addition, a system administrator's workstation 438, a user workstation 440, and a supervisor's workstation 442 are coupled to LAN 436. Alternatively, workstations 438, 440, and 442 are coupled to LAN 436 using an Internet link or are connected through an Intranet.

Each workstation, 438, 440, and 442 is a personal computer having a web browser. Although the functions performed at the workstations typically are illustrated as being performed at respective workstations 438, 440, and 442, such functions can be performed at one of many personal computers coupled to LAN 436. Workstations 438, 440, and 442 are illustrated as being associated with separate functions only to facilitate an understanding of the different types of functions that can be performed by individuals having access to LAN 436.

Server system 412 is configured to be communicatively coupled to various individuals, including employees 444 and to third parties, e.g., account holders, customers, auditors, etc., 446 using an ISP Internet connection 448. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 450, local area network 436 could be used in place of WAN 450.

In the exemplary embodiment, any authorized individual having a workstation 454 can access system 422. At least one of the client systems includes a manager workstation 456 located at a remote location. Workstations 454 and 456 are personal computers having a web browser. Also, workstations 454 and 456 are configured to communicate with server system 412. Furthermore, fax server 428 communicates with remotely located client systems, including a client system 456 using a telephone link. Fax server 428 is configured to communicate with other client systems 438, 440, and 442 as well.

While the invention has been described in terms of various specific embodiments, those skilled in the art will recognize that the invention can be practiced with modification within the spirit and scope of the claims.

What is claimed is:

1. A computer-based method for determining an optimal inspection schedule for a structure, said method comprising:
   determining a crack size distribution table for the structure by a computer using the location and inspection data;
   determining a plurality of risk values for the structure by the computer, each risk value for a different estimated usage hours of the structure and based on said crack size distribution table;
   estimating, by the computer, a first inspection interval based on a predetermined risk value threshold input into the user interface; and
   determining, by the computer, a second inspection interval based on analyzing the rate of increase of risk value and probability of detection of a crack in said first inspection interval.

2. A computer-based method according to claim 1 wherein estimating a first inspection interval comprises determining a risk associated with postponing inspection of the structure for a period of time.

3. A computer-based method according to claim 2 further comprising:
   evaluating whether the risk associated with postponing inspection of the structure is smaller than the predetermined risk value threshold; and
   if the risk is smaller, changing the current accumulated usage hours and yearly usage hours associated with an inspection interval, and repeating the determination of the first inspection interval until a larger risk, substantially close to the predetermined risk value threshold, is found.

4. A computer-based method according to claim 3 further comprising estimating the hours of structure usage until the first inspection is required.

5. A computer-based method according to claim 1 wherein determining a plurality of risk values comprises:
   defining input data for a first analysis; and
   evaluating risk at the current accumulated hours of structure usage.

6. A computer-based method according to claim 5 further comprising:
   evaluating risk at the current accumulated hours of structure usage plus or minus one to ten years of structure usage hours; and
   verifying the risk increases monotonically over the range of risk evaluation data.

7. A computer-based method according to claim 1 wherein determining a plurality of risk values comprises utilizing a crack growth analysis and an updated crack size distribution to compute a single flight probability of fracture.

8. A computer-based method according to claim 7 further comprising:
   computing a probability of detection (POD);
   computing missed cracks distribution in the structure;
   updating the crack size distribution with the computed POD; and
   computing an updated single flight probability of fracture (SFPOF) and an updated usage interval probability of failure (UIPOF).

9. A computer-based method according to claim 1 further comprising identifying all critical locations on the structure where an inspection is required.

10. A computer-based method according to claim 1 wherein determining a second inspection interval comprises modifying the second inspection interval until all risks associated with postponing inspection of the structure before a probability of detection (POD) inspection are less than the predetermined risk value threshold.

11. A computer programmed to assess risk associated with a structural inspection schedule for a flight platform, said computer programmed to:
   utilize input data to evaluate a probability of fracture risk at the current accumulated hours of usage, and the probability of fracture risks for the current accumulated hours of usage plus or minus a range of usages;
   verify, over the usage range, that the probability of fracture risks increases monotonically;
   determine a risk associated with postponing, for a period of time, the inspection described by a structural maintenance plan, the determined risk based on a period of postponement that corresponds with the probability of fracture risk for a specific level of usage;
   evaluate if the determined risk is less than a risk requirement defined in the structural maintenance plan; and
   estimate the hours of usage for the flight platform until the first inspection, which is when the risk is within a defined threshold of, but less than, the risk requirement.

12. A computer according to claim 11 wherein to utilize input data to evaluate a probability of fracture risk, said computer is programmed to utilize crack growth analysis data and data relating to an updated crack size distribution in the computation of a single flight probability of fracture (SFPOF).

13. A computer according to claim 11 wherein said computer is programmed to:
   evaluate whether the risk associated with postponing inspection of the structure is smaller than the risk requirement defined in the structural maintenance plan; and
   change the current accumulated usage hours and yearly usage hours associated with an inspection interval until a larger risk, substantially close to the predetermined risk value threshold, is found.

14. A computer according to claim 11, wherein to determine a risk associated with postponing the inspection described by a structural maintenance plan, said computer is programmed to:

compute a probability of detection (POD);
compute missed cracks distribution in the structure;
update the crack size distribution with the computed POD; and
compute an updated single flight probability of fracture (SFPOF) and an updated usage interval probability of failure (UIPOF).

15. A computer according to claim 11 wherein said computer is programmed to produce a single flight probability of failure (SFPOF) for each near term inspection that is identified in a force structural maintenance plan.

16. A computer-based method for assessing a risk associated with a structural inspection schedule for a flight platform, said method comprising:
evaluating, based on data input into a computer, a probability of fracture risk at the current accumulated hours of usage, and the probability of fracture risks for the current accumulated hours plus or minus a range of usage hours;
verifying, based on computer generated results, and over the range of usage hours, that the probability of fracture risks increases monotonically;
determining, by the computer, a risk associated with postponing, for a period of time, the inspection described by a structural maintenance plan, the determined risk based on a period of postponement that corresponds with the probability of fracture risk for a specific usage hour;
evaluating, by the computer, if the determined risk is less than a risk requirement defined in the structural maintenance plan; and
estimating, by the computer, the hours of usage for the flight platform until the first inspection is needed, which is when the risk is within a defined threshold of, but less than, the risk requirement.

17. A computer-based method according to claim 16 further comprising utilizing crack growth analysis data and data relating to an updated crack size distribution to compute a single flight probability of fracture (SFPOF).

18. A computer-based method according to claim 16 further comprising:
evaluating whether the risk associated with postponing inspection of the structure is smaller than the risk requirement defined in the structural maintenance plan; and
changing the current accumulated usage hours and yearly usage hours associated with an inspection interval until a larger risk, substantially close to the predetermined risk value threshold, is found.

19. A computer-based method according to claim 16, wherein determining a risk associated with postponing the inspection described by a structural maintenance plan comprises:
computing a probability of detection (POD);
computing a missed cracks distribution in the structure;
updating the crack size distribution with the computed POD; and
computing an updated single flight probability of fracture (SFPOF) and an updated usage interval probability of failure (UIPOF).

20. A computer-based method according to claim 16 further comprising producing a single flight probability of failure (SFPOF) for each near term inspection that is identified in a force structural maintenance plan.

* * * * *